US012474340B2

(12) United States Patent
Niazi et al.

(10) Patent No.: US 12,474,340 B2
(45) Date of Patent: Nov. 18, 2025

(54) VALIDATION OF NEOEPITOPE PRESENTATION

(71) Applicant: Nant Holdings IP, LLC, Culver City, CA (US)

(72) Inventors: Kayvan Niazi, Culver City, CA (US); Nicholas J. Witchey, Culver City, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 489 days.

(21) Appl. No.: 16/647,277

(22) PCT Filed: Sep. 24, 2018

(86) PCT No.: PCT/US2018/052459
§ 371 (c)(1),
(2) Date: Mar. 13, 2020

(87) PCT Pub. No.: WO2019/060835
PCT Pub. Date: Mar. 28, 2019

(65) Prior Publication Data
US 2020/0225229 A1      Jul. 16, 2020

Related U.S. Application Data

(60) Provisional application No. 62/562,589, filed on Sep. 25, 2017.

(51) Int. Cl.
| | |
|---|---|
| *G01N 33/569* | (2006.01) |
| *A61K 39/00* | (2006.01) |
| *A61K 40/11* | (2025.01) |
| *A61K 40/31* | (2025.01) |
| *A61K 40/42* | (2025.01) |
| *C07K 14/47* | (2006.01) |
| *C07K 14/725* | (2006.01) |
| *C07K 16/30* | (2006.01) |
| *G01N 33/574* | (2006.01) |

(52) U.S. Cl.
CPC ....... *G01N 33/56977* (2013.01); *A61K 39/00* (2013.01); *A61K 40/11* (2025.01); *A61K 40/31* (2025.01); *A61K 40/4201* (2025.01); *C07K 14/47* (2013.01); *C07K 14/7051* (2013.01); *C07K 16/30* (2013.01); *G01N 33/57484* (2013.01); *G01N 2333/70539* (2013.01)

(58) Field of Classification Search
CPC ......... G01N 33/57492; G01N 2800/52; G01N 33/5047; G01N 33/56977; A61K 35/17; A61K 39/0011; C07K 16/30; C07K 2317/21; C07K 2317/24; C07K 2317/565
See application file for complete search history.

(56) References Cited

U.S. PATENT DOCUMENTS

| | | | |
|---|---|---|---|
| 1,144,116 A * | 6/1915 | Foulke | B60B 1/12 301/67 |
| 5,225,539 A | 7/1993 | Winter | |
| 5,939,598 A | 8/1999 | Kucherlapati et al. | |
| 5,969,108 A | 10/1999 | McCafferty et al. | |
| 7,473,532 B2 | 1/2009 | Darffer et al. | |
| 8,623,358 B2 | 1/2014 | Benatuil et al. | |
| 9,091,651 B2 | 7/2015 | Kearney et al. | |
| 10,793,875 B2 * | 10/2020 | Soon-Shiong | A61K 38/19 |
| 11,154,597 B2 * | 10/2021 | Niazi | A61K 39/0011 |
| 11,276,479 B2 * | 3/2022 | Nguyen | G01N 33/5748 |
| 2003/0180817 A1 * | 9/2003 | Macina | G01N 33/57419 424/1.49 |
| 2007/0048330 A1 * | 3/2007 | Sette | A61K 39/12 435/456 |
| 2012/0059670 A1 | 3/2012 | Sanborn et al. | |
| 2012/0066001 A1 | 3/2012 | Sanborn et al. | |
| 2016/0101170 A1 | 4/2016 | Hacohen et al. | |

FOREIGN PATENT DOCUMENTS

| | | | |
|---|---|---|---|
| WO | 90/02809 A1 | 3/1990 | |
| WO | 98/31700 A1 | 7/1998 | |
| WO | WO-2014180569 A1 * | 11/2014 | A61K 39/00 |
| WO | 2015/103037 A2 | 7/2015 | |
| WO | 2016/164833 A1 | 10/2016 | |
| WO | 2016/172722 A1 | 10/2016 | |
| WO | 2016191545 A1 | 12/2016 | |
| WO | 2017011660 A1 | 1/2017 | |
| WO | 2017066339 A1 | 4/2017 | |
| WO | WO-2017066256 A2 * | 4/2017 | A61K 39/0011 |
| WO | 2017/100338 A1 | 6/2017 | |
| WO | 2017139694 A1 | 8/2017 | |
| WO | 2019/060835 A2 | 3/2019 | |
| WO | 2019/060835 A3 | 7/2019 | |

OTHER PUBLICATIONS

Tran et al. Immunogenicity of somatic mutations in human gastrointestinal cancers. Science Dec. 11, 2015 • vol. 350 Issue 6266 (Year: 2015).*
Cohen et al.Recombinant antibodies with MHC-restricted, peptide-specific, T-cell receptor-like specificity: new tools to study antigen presentation and TCR-peptide-MHC interactions.J. Mol. Recognit. 2003; 16: 324-332 (Year: 2003).*
Tran Science supplemental materials. 2015 (Year: 2015).*
Goel et al. Plasticity within the Antigen-Combining Site May Manifest as Molecular Mimicry in the Humoral Immune Response. J Immunol (2004) 173 (12): 7358-7367. (Year: 2004).*
Lloyd et al.Modelling the human immune response: performance of a 1011 human antibody repertoire against a broad panel of therapeutically relevant antigens. Protein Engineering, Design & Selection vol. 22 No. 3 pp. 159-168, 2009. (Year: 2009).*

(Continued)

*Primary Examiner* — Janet L Andres
*Assistant Examiner* — Brian Hartnett
(74) *Attorney, Agent, or Firm* — Umberg Zipser LLP; Martin Fessenmaier; Priti Phukan

(57) ABSTRACT

Systems and methods for predicting MHC presentation of a neoepitope of a tumor or for predicting an immune response against an MHC presented neoepitope of a tumor are disclosed. The methods use sequence information of the neoepitope.

17 Claims, 3 Drawing Sheets

(56) References Cited

OTHER PUBLICATIONS

Rabia et al Understanding and overcoming trade-offs between antibody affinity,specificity, stability and solubility (Biochemical Engineering Journal 137 (2018) 365-374) (Year: 2018).*
Trenevska. Therapeutic Antibodies against intracellular Tumor AntigensFrontiers in Immunology, Aug. 2017 | vol. 8 | Article 1001 (Year: 2017).*
Hackl Computational genomics tools for dissecting tumour-immune cell interactions (Nature Reviews Genetics, vol. 17, Aug. 2016) (Year: 2016).*
Extended European Search Report received for European Patent Application Serial No. 18858447.8 dated Sep. 2001, 9 pages.
Nguyen, A. et al., 'Identifying patient-specific neoepitopes for cell-basedand vaccine immunotherapy targets in breast cancer patients by HLA typingand predicting MHC presentation from whole genome and RNA sequencing data', In: ASCO 2016, Jun. 3-7, 2016, Chicago, IL, USA, Abstract No. 11606.
International Search Report with International Application No. PCT/US2018/052459 dated: Sep. 24, 2018, pp. 12.
Communication pursuant to Rule 164(1) EPC received for European Patent Application Serial No. 18858447.8 Jun. 1, 2021, 9 pages.
Gross Ludwik, "Intradermal Immunization of C3H Mice against a Sarcoma That Originated in an Animal of the Same Line", Cancer research, 1943, pp. 326-333 (Cited from Specification).
Foley E. J., "Antigenic Properties of Methylcholanthrene-induced Tumors in Mice of the Strain of Origin", Cancer research, 1953, pp. 835-837 (Cited from Specification).
Prehn et al., "Immunity to Methylcholanthrene-Induced Sarcomas", Journal of the National Cancer Institute, Jun. 1957, vol. 18, No. 6, pp. 769-778 (Cited from Specification).
Old L. J., "Cancer immunology: The search for specificity", National Cancer Institute Monograph, 1982, vol. 60, pp. 193-209 (Cited from Specification).
Gubin et al., "Tumor neoantigens: building a framework for personalized cancer immunotherapy", The Journal of Clinical Investigation, Sep. 2015, vol. 125, No. 9, pp. 3413-3421 (Cited from Specification).
Srivastava PK et al., "Neoepitopes of Cancers: Looking Back, Looking Ahead", Cancer Immunol Res., Sep. 2015, vol. 3, No. 9, 18 pages (Cited from Specification).
Heemskerk et al., "The cancer antigenome", The Embo Journal, 2013, vol. 32, No. 2, pp. 194-203 (Cited from Specification).
Lennerz et al., "The response of autologous T cells to a human melanoma is dominated by mutated neoantigens", PNAS, Nov. 1, 2005, vol. 102, No. 44, p. 16013-16018 (Cited from Specification).
Fritsch et al., "HLA-Binding Properties of Tumor Neoepitopes in Humans", Cancer immunology research, Jun. 2014, vol. 2, No. 6, pp. 522-529 (Cited from Specification).
Reuter et al., "High-Throughput Sequencing Technologies", Mol Cell, May 21, 2015, vol. 58, No. 4, 23 pages (Cited from Specification).
Chowell et al., "TCR contact residue hydrophobicity is a hallmark of immunogenic CD8+ T cell epitopes", Pnas, Mar. 23, 2015, pp. E1754-E1762 (Cited from Specification).
Segal et al., "Epitope landscape in breast and colorectal cancer", Cancer Research, 2008, vol. 68, No. 3, pp. 889-892 (Cited from Specification).
Lundegaard et al., "NetMHC-3.0: accurate web accessible predictions of human, mouse and monkey MHC class I affinities for peptides of length 8-11", Nucleic Acids Research, Web Server issue, 2008, vol. 36, pp. W509-W512 (Cited from Specification).
Green et al., "Molecular Cloning A Laboratory Manual", 4th edition, Cold spring harbor laboratory press, 2012, 34 pages (Cited from Specification).
Carmen et al., "Concepts in antibody phage display" Briefing in Functional genomics and Proteomics, Jul. 2002, vol. 1, No. 2, pp. 189-203 (Cited from Specification).
Hosse et al., "A new generation of protein display scaffolds for molecular recognition", Protein Science, 2006, vol. 15, pp. 14-27 (Cited from Specification).
Brinkmann et al., "Phage display of disulfide-stabilized Fv fragments", journal of Immunological methods, 1995, vol. 182, pp. 41-50 (Cited from Specification).
Roberts et al., "RNA-peptide fusions for the in vitro selection of peptides and proteins", Proceeding of National Academy of sciences, Nov. 1997, vol. 94, pp. 12297-12302 (Cited from Specification).
Brekke et al., "Therapeutic antibodies for human diseases at the dawn of the twenty-first century", Nature Reviews Drug Discovery, Jan. 2003, vol. 2, pp. 52-62 (Cited from Specification).
Tscharke et al., "Sizing up the key determinants of the CD8(+) T cell response", Nature review, Immunology, Nov. 2015, vol. 15, pp. 705-716 (Cited from Specification).
Mareeva et al., "Antibody Specific for the PeptideMajor Histocompatibility Complex", The Journal Of Biological Chemistry, 2004, vol. 279, No. 43, pp. 44243-44249 (Cited from Specification).
Cohen et al., "T-Cell Receptor-Like Antibodies: Targeting the Intracellular Proteome Therapeutic Potential and Clinical Applications", Antibodies, 2013, vol. 2, pp. 517-534 (Cited from Specification).
Andersen et al., "A recombinant antibody with the antigen-specific, major histocompatibility complex-restricted specificity of T cells", Proc. Natl. Acad. Sci. USA, Mar. 1996, vol. 93, pp. 1820-1824 (Cited from Specification).
Li et al., "Engineering chimeric human and mouse major histocompatibility complex (MHC) class I tetramers for the production of T-cellreceptor (TCR) mimic antibodies", Plos One, 2017, pp. 1-16 (Cited from Specification).
Clay et al., "Assays for Monitoring Cellular Immune Responses to Active Immunotherapy of Cancer", Clinical Cancer Research, May 2001, vol. 7, pp. 1127-1135 (Cited from Specification).
Kreutzer et al., "Standard practices for Fmoc-based solid-phasepeptide synthesis in the Nowick laboratory", 2018, 14 pages (Cited from Specification).
Osbourn et al., "Directed selection of MIP-1 alpha neutralizing CCR5 antibodies from a phage display human antibody library", Nature biotechnology, Aug. 1998, vol. 16, pp. 778-781 (Cited from Specification).
Chames et al., "Direct selection of a human antibody fragment directed against the tumor T-cell epitope HLA-A1-MAGE-A1 from a nonimmunized phage-Fab library", PNAS, Jul. 5, 2000, vol. 97, No. 14, pp. 7969-7974 (Cited from Specification).
Porgador et al., "Localization, Quantitation, and In Situ Detection of Specific Peptide-MHC Class I Complexes Using a Monoclonal Antibody", Immunity, Jun. 1997, vol. 6, pp. 715-726 (Cited from Specification).
"Dynabeads® FlowComp™ Flexi, part A Isolation directly from whole blood/buffy coat", Invitrogen by life technologies, May 2012, 2 pages (Cited from Specification).
Malyguine et al., "ELISPOT Assay for Monitoring Cytotoxic T Lymphocytes (CTL) Activity in Cancer Vaccine Clinical Trials", Cells, 2012, pp. 111-126 (Cited from Specification).
Sadelain et al., "The basic principles of chimeric antigen receptor design", Cancer discovery, Apr. 2013, vol. 3, No. 4, 21 pages (Cited from Specification).
Smith et al., "Chimeric antigen receptor (CAR) T cell therapy for malignant cancers: Summary and perspective", Journal of cellular immunotherapy, 2016, 10 pages (Cited from Specification).
Hermanson et al., "Utilizing chimeric antigen receptors to direct natural killer cell activity", Frontiers in Immunology, Apr. 2015, vol. 6, No. 195, 6 pages (Cited from Specification).
Carlsten et al., "Genetic Manipulation of NK Cells for Cancer Immunotherapy: Techniques and Clinical Implications", Frontiers in Immunology, Jun. 2015, vol. 6, No. 266, 9 pages (Cited from Specification).
Yadav et al., "Predicting immunogenic tumour mutations by combining mass spectrometry and exome sequencing", Nature, Nov. 27, 2014, vol. 515, 16 pages (Cited from Specification).
Guzman et al., "Peptide synthesis: chemical or enzymatic", Electronic Journal of Biotechnology, 2007, vol. 10, No. 2, 279-314 (Cited from Specification).

(56) References Cited

OTHER PUBLICATIONS

International Preliminary Report on Patentability Chapter I received for PCT Application Serial No. PCT/US2018/052459 dated Apr. 9, 2020, 11 pages.
Communication pursuant to Rules 161(2) and 162 EPC received for European Patent Application Serial No. 18858447.8 dated May 7, 2020, 3 pages.
Snyder et al., "Genetic Basis for Clinical Responseto CTLA-4 Blockade in Melanoma", The New England Journal of Medicine, Dec. 4, 2014, vol. 371, No. 23, pp. 2189-2199.
Vartanian et al., "Gene expression profiling of whole blood: Comparison of target preparation methods for accurate and reproducible microarray analysis", BMC Genomics, 2009, vol. 10, No. 2, pp. 1-16 (Cited from Specification).
Fukuda et al., "In vitro evolution of single-chain antibodies using mRNA display", Nucleic Acids Research, 2006, vol. 34, No. 19, pp. 18 (Cited from Specification).

\* cited by examiner

VALIDATION OF NEOEPITOPE PRESENTATION

This application claims priority to our PCT application with the serial number PCT/US2018/052459, which was filed Sep. 24, 2018 and U.S. provisional application 62/562,589, which was filed Sep. 25, 2017, which are incorporated by reference herein.

FIELD OF THE INVENTION

The field of the invention is validation of predicted MHC-presentation of neoepitopes from a tumor.

BACKGROUND

During the mid-twentieth century, studies conducted by several research teams suggested that tumor cells possessed unique markers. In particular, it was shown that mice could become resistant to a specific carcinogen-induced tumor, while not becoming resistant to other tumors (see, Gross, *Cancer Res.* (1943) 3(5):326-333; Foley, *Cancer Res.* (1953) 13(12):835-837; Prehn et al., *J. Natl Cancer Inst.* (1957) 18(6):769-778; Old, *Natl Cancer Inst Monogr.* (1982) 60:193-209).

Over the next several decades, advances in molecular and cell biology identified specific molecules associated with antigen presentation, including major histocompatibility complexes (MHC). In conjunction with these advances, other technologies were developed that allowed the propagation of various types of immune cells, including cytotoxic T lymphocytes, in cell culture (see, Gubin et al., *J. Clin Invest.* (2015) 125(9): 3413-3421).

Further studies showed that human T cells predominantly reacted with tumor cells but not normal cells, suggesting that human cancers either displayed tumor specific markers or markers that were expressed at lower levels in normal tissues (see, Gubin et al., supra.). These advances suggested that human cancers possessed specific protein sequences that might be targeted for therapeutic treatment. However, identifying these specific sequences remained elusive.

These early studies prompted extensive research to identify cancer-specific molecules. While this line of investigation successfully identified molecules that were overexpressed or underexpressed in various tumors/cancers, these studies were not highly successful in identifying truly cancer specific molecules (see, Srivastava, *Cancer Immunol. Res.* (2015) 3(9): 969-977). Although therapeutic monoclonal antibodies were developed that bound to epitopes expressed on cancer cells, these same targets often were shown to be expressed at lower levels on normal cells. Clinical trials based on markers displayed in both cancerous and non-cancerous cells have response rates typically ranging from 3-20% and often revealed significant toxicity effects (see, Heemskerk et al., *EMBO J.* (2013) 32:194-203). Nevertheless, such non-specific therapeutic treatments are commonly used today, despite patients often experiencing undesirable side effects due to lack of specificity (see, Srivastava supra).

Recent advances in high-throughput sequencing and bioinformatics have allowed the identification of mutations in cancer cells on an unprecedented scale. This technology has allowed hundreds, if not thousands, of cancer genomes to be sequenced. These cancer genome sequences can be compared with normal genomes to determine the presence of protein-changing mutations. Various studies have shown that tumorigenic/cancerous cells contain tens to hundreds, and in some cases, almost a thousand somatic mutations (see, Heemskerk supra). These mutations result in neoantigens, which are newly formed antigens that have not previously been recognized by the host immune system.

Neoantigens arise as a result of the large number of protein-changing somatic cell mutations in tumorigenic cells, and therefore, are tumor- and patient-specific. Some of these mutations are expressed and displayed on the cell surface while other mutations are displayed as peptides bound to MHC molecules on the surface of the tumorigenic cell, providing a unique marker to the tumorigenic cell. The specificity of neoantigens confers a variety of potential advantages for therapy, as compared to self-antigens that may be over- or under-expressed in tumors. For example, because neoantigens are not present in normal cells of the human body, immune system tolerance resulting from mechanisms of central T cell tolerance is minimized. Further, the uniqueness of the neoantigen sequences means that selecting neoantigens as therapeutic targets potentially minimizes autoimmune toxicity and other deleterious side effects. Accordingly, unlike self-antigens, which may be expressed on normal tissues, cells, and organs, neoantigens are expressed only on tumorigenic/cancerous cells and remain an attractive target for new cancer therapies.

Despite these advances, the question remains as to how best to use sequencing information to identify those mutations that have the ability to induce a tumor specific T cell response out of the thousand or so mutations in a tumor cell. While more recent studies (see, Lennerz, *Proc. Nat'l Acad. Sci.* USA (2005) 102:16013-16018) have analyzed large sets of neoantigens in an attempt to identify which neoepitopes are capable of triggering a targeted immune response, this approach is problematic. One issue is that not all neoepitopes will bind to MHC molecules, and thus, not all neoepitopes are capable of being presented on the surface of a cell (see, Heemskerk supra).

This problem is further confounded by Human Leukocyte Antigen (HLA) gene complex diversity, or polymorphisms, present within individual patients. The HLA gene complex, present on chromosome 6p21 and comprising hundreds of different genes, encodes for MHC class I and MHC class II molecules involved in the display of neoepitopes on the surface of the cell and the activation of an immune response. The HLA gene complex includes MHC class I genes, e.g., HLA-A, HLA-B and HLA-C, and MHC class II genes, e.g., HLA-DM, HLA-DO, HLA-DP, HLA-DQ, and HLA-DR. HLA genes are highly polymorphic—for example, more than 12,000 class I alleles and more than 4,000 class II alleles are known (see e.g., URL:www.ebi.ac.uk/ipd/imgt/hla/stats.html). Such diversity makes it difficult to predict which neoepitopes will trigger an immune response in a particular individual. For example, two individuals, each having different class I alleles, may produce different MHC class I molecules that bind to different neoepitopes. Thus, while the discovery of a large number of mutations within cancer cells provides a potentially unlimited number of therapeutic targets for the treatment of cancer, the problem still remains of how best to determine which of these mutations correspond to neoepitopes that are successfully displayed on the surface of the tumorigenic cell.

Given the enormous diversity of neoepitopes, particularly in combination with patient HLA gene complex diversity, existing models of neoepitope-based treatments have uncertainties with respect to efficacy and patient outcome. Unlike conventional chemotherapeutic treatments, in which techniques for determining efficacy of the treatments are often performed (e.g., using in vitro methods or using a severe combined immunodeficiency (SCID) mouse model), systems and methods for testing efficacy of patient- and tumor-specific immune therapy generally are not known.

While computer docking simulations of MHC class I and MHC class II binding to an neoepitope may be performed, these simulations offer no guarantee that a particular neoepitope will be presented on the surface of the cell as these types of simulations generally base their predictions on affinity and sequence information, while ignoring upstream processing. Some neoepitopes may be degraded due to intracellular processes, and still other neoepitopes may not be compatible with transport mechanisms (e.g., transport through the TAP inhibitor into the endoplasmic reticulum (ER) and/or through the Golgi apparatus) for surface display. All of these upstream processes reduce the number of epitopes that are displayed on the surface of the cell. Determining which neoepitopes from among hundreds or thousands of neoepitopes that will be displayed on the cell surface is therefore uncertain.

Thus, even though various systems and methods of immune therapy for many cancers are known in the art, all or almost all of them suffer from several drawbacks. Therefore, there is still a need to provide improved systems and methods to more accurately predict the likelihood of success of immune therapy using patient- and tumor-specific neoepitopes.

SUMMARY OF THE INVENTION

Systems and methods are provided for validation of predicted MHC-presentation of neoepitopes from a tumor.

In one aspect, a method of validating predicted MHC presentation of a neoepitope of a tumor is presented, comprising: (1) obtaining neoepitope sequence data from the tumor of the patient; (2) generating a recombinant expression system configured to express a recombinant protein comprising the neoepitope sequence, and transfecting a cell with the recombinant expression system; (3) culturing the transfected cell under conditions to express the recombinant protein; and (4) identifying MHC presentation of the neoepitope on the surface of the transfected cell.

In another aspect, a method is presented comprising: (1) generating a synthetic neoepitope peptide using neoepitope sequence data from the tumor of the patient; (2) generating a synthetic antibody against the synthetic neoepitope peptide; (3) exposing a cell with MHC presentation of the neoepitope to the synthetic antibody to allow binding of the synthetic antibody to the MHC presented neoepitope; and (4) detecting the bound synthetic antibody on the cell.

In another aspect, a method is presented comprising: (1) obtaining sequence information of an antibody that binds the neoepitope of the tumor; (2) using the sequence information to generate a recombinant expression system that encodes a chimeric antigen receptor comprising at least a portion of the antibody; (3) transfecting an immune competent cell with the recombinant expression system to express the chimeric antigen receptor; (4) contacting the transfected immune competent cell with a cell with MHC presentation of the neoepitope; and (5) identifying cytotoxic activity of the transfected immune competent cell upon contact of the transfected immune competent cell with the cell with MHC presentation of the neoepitope.

In another aspect, a method is presented comprising: (1) obtaining neoepitope sequence data from the tumor of the patient; (2) generating a recombinant expression system configured to express a recombinant protein comprising the neoepitope sequence, and transfecting a cell with the recombinant expression system; (3) culturing the transfected cell under conditions to express the recombinant protein; (4) contacting the transfected cells with immune competent cells of the patient under conditions effective to generate an immune response in the immune competent cells; and (5) detecting or quantifying the immune response in the immune competent cells.

In another aspect, a method is presented comprising: (1) generating a synthetic neoepitope peptide using neoepitope sequence data from the tumor of the patient; (2) exposing plasma or serum of the patient to the synthetic neoepitope peptide under conditions to allow binding of an antibody in the plasma or serum of the patient to the synthetic neoepitope peptide; and (3) detecting the bound antibody.

In another aspect, a method is presented comprising: (1) generating a synthetic neoepitope peptide using neoepitope sequence data from the tumor of the patient; (2) exposing immune competent cells of the patient to the synthetic neoepitope peptide under conditions to allow binding of the synthetic neoepitope peptide to at least one immune competent cell; and (3) detecting or isolating the immune competent cell to which the synthetic neoepitope peptide is bound.

Various objects, features, aspects and advantages of the present subject matter will become more apparent from the following detailed description of preferred embodiments.

DETAILED DESCRIPTION

Figure 1A:
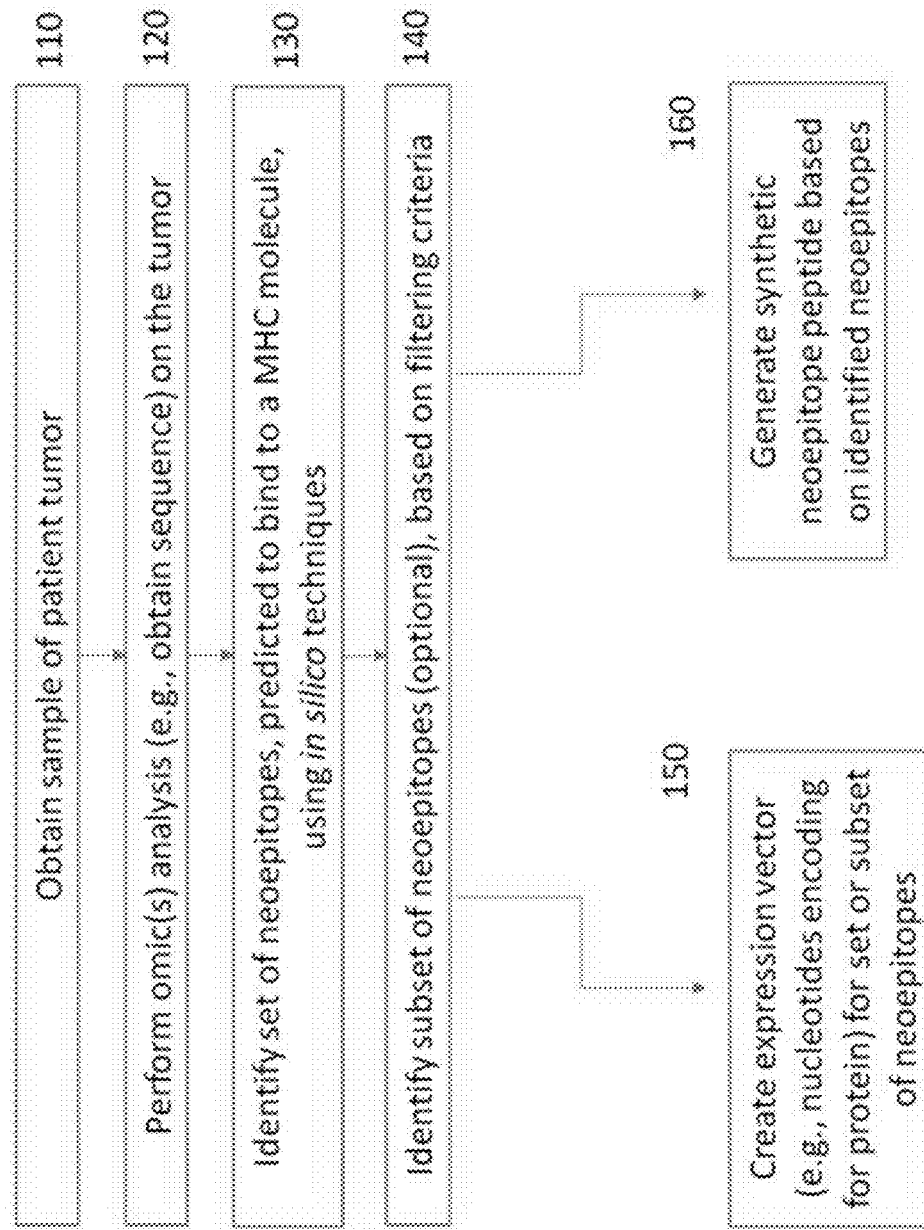
FIG. 1A is a schematic exemplary flowchart of generating synthetic or recombinant neoepitopes.

Compositions, systems, and methods for validating predicted MHC-presentation of neoepitopes from a tumor of a patient are provided.

Patient- and tumor-specific neoepitopes obtained from sequencing studies can be obtained, and simulations can predict which of these candidate neoepitopes are likely to be displayed on the surface of the cell. Predictions regarding which neoepitopes are to be displayed can be validated using antibody-based assays.

As used herein, "administration" refers to the administration of a composition to a patient in need thereof. Administration may occur by any suitable route, including but not limited to, bronchial, enteral, intradermal, intra-arterial, intradermal, intragastric, intramedullary, intramuscular, intranasal, intrathecal, intravenous, intraventricular, mucosal, nasal, oral, rectal, subcutaneous, sublingual, topical, tracheal, transdermal, vaginal, and vitreal.

As used herein, "affinity" is a measure of the strength with which a ligand binds to its receptor. In some embodiments, affinity is measured using quantitative assays known to one of skill in the art, e.g., using an ELISA assay.

As used herein, the term "antibody" generally refers to immunoglobulin molecules and immunologically active portions or fragments thereof of immunoglobulin molecules, i.e., molecules that contain an antigen or neoepitope binding site that immunospecifically binds to an antigen (e.g., neoepitope, neoepitope/MHC complex). Unless the context dictates otherwise, the term "antibody" or "antibodies" includes but is not limited to all isotypes and subtypes of antibodies (e.g., IgA, IgD, IgE, IgG, IgM, etc.), any class (e.g., IgG1, IgG2, IgG3, IgG4, IgA1, and IgA2) or subclass of immunoglobulin molecule, as well as all active fragments (having immunological activity) thereof. It is also understood that any heavy chain (e.g., IgA, IgD, IgE, IgG, or IgM) may be paired with any light chain (e.g., kappa or lambda forms).

Antibodies also include, but are not limited to, monoclonal antibodies, polyclonal antibodies, human antibodies, humanized antibodies, murine antibodies, conjugated antibodies (e.g., to a chemotherapeutic agent, to a radionuclide, to another protein, etc.), synthetic antibodies, bi-specific antibodies, chimeric antibodies, single chain antibodies, antibody fragments produced by a Fab expression library, and antibody fragments produced by mRNA display or phage display. Antibodies also include but are not limited to monovalent immunoglobulins (e.g., IgG), and fragments, e.g., $F(ab')_2$, $Fab_2$, Fab', Fab, Fv, single-chain Fv (scFv), scFv-Fc, VhH, disulfide-linked Fvs (sdFv), etc. or any active fragment thereof. It is understood that any one or more of the CDRs of any antibody fragment may be grafted onto another molecule, e.g., a T cell receptor, a humanized antibody backbone or scaffold, etc.

As used herein, "composition" or "pharmaceutical composition" refers to a formulation comprising an active ingredient (e.g., a recombinant or synthetic peptide, an antibody, a checkpoint inhibitor, etc.) and may include one or more additional ingredients (e.g., buffers, excipients, stabilizers, diluents, emulsifiers, preservatives, etc.).

As used herein, and unless the context dictates otherwise, the term "coupled to" or "coupled with" is intended to include both direct coupling (in which two elements that are coupled to each other contact each other) and indirect coupling (in which at least one additional element is located between the two elements). Therefore, the terms "coupled to" and "coupled with" are used synonymously.

As used herein, "human" antibodies refer to antibodies having the amino acid sequence of a human immunoglobulin. Human antibodies include antibodies that are isolated from human immunoglobulin libraries or from animals transgenic for one or more human immunoglobulins and that do not express endogenous immunoglobulins (see, e.g., U.S. Pat. No. 5,939,598). As used herein, "humanized" antibodies refer to antibodies that retain certain antigen binding properties but are less immunogenic, esp. with regard to administration to a human patient. For example, humanization by CDR grafting involves transferring the CDRs of a non-human antibody that binds to the target of interest into a human backbone.

As used herein, "immune therapy" includes any and all manners of utilizing a patient's immune system to recognize and destroy cancer cells (e.g., using cells of the immune system, including cytotoxic T cells, $CD4^+$ T cells, dendritic cells, NK cells, and chimeric antigen receptor (CAR) T cells, chimeric CD16, macrophages, dendritic cells, monocytes, neutrophils, basophiles or eosinophils cell, B cells, unmodified or modified cells of the immune system, or other components such as antibodies, cytokines, checkpoint inhibitors, etc.). Modified immune cells are cells that have been genetically altered, e.g., a CAR T cell, to recognize an antigen (e.g., a neoantigen). Immune competent cells include cytotoxic $CD8^+$ T cells, $CD4^+$ T cells, dendritic cells, NK cells, and chimeric antigen receptor (CAR) T cells, macrophages, dendritic cells, monocytes, neutrophils, basophiles or eosinophils, B cells, unmodified or modified cells of the immune system, exhausted immune competent cells. In some cases, immune competent cells are obtained from a white blood cell fraction of a patient, e.g., the same patient as from which the tumor is obtained. Any of these cells may be genetically modified to optionally express a recombinant co-stimulatory molecule (e.g., such as a cytokine). Unmodified cells are the native immune cells of the patient.

As used herein, a "matched normal control" refers to a non-disease biological sample (e.g., blood, tissue, fluid, etc.), preferably from the same patient as the tumor. For DNA analysis, a matched normal control may be obtained from a blood sample, a buccal swab or any other non-disease tissue. For expression analysis, a matched normal control is preferably obtained from normal tissue adjacent to and of the same type as the tumor. In some embodiments, the data obtained from analyzing a tumor (e.g., from whole genome sequencing, exome sequencing, transcriptome analysis, proteomic analysis, etc.) is compared to the matched normal control data prior to initiation of patient treatment.

As used herein, "neoantigen" refers to a new antigen, arising as a result of one or more somatic mutations, and unique to a tumor cell. Neoantigens are not found in germline or normal cells. A cancer specific antigen is specific to the tumor/cancer cell and is not found on normal cells. A tumor associated antigen is an antigen that is overexpressed in a tumor/cancer cell as compared to a normal cell.

As used herein, "neoepitope" is a relatively short peptide that binds to a MEW class I or MEW class II molecule for presentation to the immune system, e.g., a $CD4^+$ helper T cell or a $CD8^+$ cytotoxic T-cell. The neoepitope, which is not present within germline or normal cells, is recognized as non-self and therefore has the capacity to trigger an immune response. Thus, a neoepitope is a short sequence of amino acids, e.g., an antigenic determinant, which binds to a MHC molecule for subsequent presentation to a T cell to trigger an immune response.

In general, neoepitopes are derived from neoantigens, with a neoantigen comprising one or more neoepitopes. For example, neoantigens may be degraded by the proteasome to form a plurality of neoepitopes. The optimal length of the neoepitope will depend on whether the neoepitope binds to a MHC class I or a MHC class II molecule. In general, neoepitopes may range from 2 to 50 amino acids, as well as any length in between. Additional examples of neoepitope lengths are provided throughout this disclosure. In a preferred embodiment, the mutation(s) in a neoepitope are located centrally relative to the center amino acid position of the neoepitope. Neoepitopes may be present on the surface of a tumor cell as part of a neoantigen that is attached to the surface of the cell (provided that the neoepitope is exposed and not buried within the tertiary structure of the neoantigen) or the neoepitope may be present as part of a MHC/neoepitope complex.

As used herein, "omics analysis" refers to any type of analysis geared towards collectively characterizing and/or quantifying large pools of biological molecules in order to understand the structure, function and dynamics of an organism, biological process, or disease. Types of analysis include but are not limited to whole genome sequencing, exome sequencing, transcriptome analysis, proteomics, metabolomics, etc.

As used herein, a "proxy cell" is a cell selected for its similarity to a tumor cell (e.g., especially a patient tumor cell). Proxy cells may be obtained from the ATCC or other repository, and suitable software for selecting a proxy cell, such as PARADIGM, may be implemented in order to pick a proxy cell having a high similarity to a particular type of tumor cell.

As used herein, "specifically binds" typically refers to non-covalent interactions between a target entity (e.g., a neoepitope) and a binding agent (e.g., an antibody, a T-cell, a MHC complex, etc.), and usually refers to the presence of such an interaction with a particular structural feature (e.g., such as an antigenic determinant) of the target entity with the binding agent. As understood by one of skill in the art, an interaction is considered to be specific if it occurs in the presence of other alternative interactions. In some aspects, specifically binders may be assessed by measurement of a $K_D$ value, e.g., by determining an absolute $K_D<10^6$ M, an absolute $K_D<10^7$ M, or an absolute $K_D<10^8$ M. In other embodiments, a relative $K_D$ difference between a specific binder and a non-specific binder of at least $10^3$M may indicate specific binding.

As used herein, "synthetic antibody" refers to an antibody that is generated in a process other than immunization of an animal. Most typically, synthetic antibodies are isolated from a high-diversity library of antibodies or antibody fragments such as from phage panning or mRNA display. Synthetic antibodies may have specific binding to a synthetic neoepitope peptide or a MHC/neoepitope complex according to any of the techniques presented herein. For example, synthetic antibodies that bind to a synthetic neoepitope peptide may be generated from phage display or mRNA display. In other examples, synthetic antibodies may be generated against a recombinantly expressed MHC/neoepitope complex. The term synthetic antibody as used herein refers not only to immune globulins and fragments thereof, but also to binding entities that are derived from an affinity selection and/or maturation process (e.g., from mRNA display or phage display). For example, scFvs or fragments thereof (e.g., including the complementarity determining regions (CDRs)) responsible for specifically binding to the synthetic neoepitope peptide may be incorporated into an antibody backbone or scaffold, e.g., to generate a full length antibody having specificity for the synthetic neoepitope peptide. In some embodiments, the synthetic antibody is specific for the synthetic neoepitope peptide against which it is generated, as well as for the neoepitope on the surface of the tumor cell. In other embodiments, the synthetic antibody is specific for a neoepitope/MHC complex.

As used herein, "synthetic neoepitope peptide" refers to a synthetic peptide having the same amino acid sequence (or at least 80% or greater homology) as the neoepitope displayed (or predicted to be displayed by in silico methods) on the surface of a tumorigenic cell. In some embodiments, the synthetic neoepitope peptide is utilized in phage display or mRNA display to generate a synthetic antibody that specifically binds to the synthetic neoepitope peptide, and therefore, also binds to the corresponding neoepitope displayed on the surface of the tumor cell. Synthetic neoepitope peptides can be produced by solid state synthesis, e.g., Merrifield synthesis.

As used herein, "tumor" or "tumorigenic" refers to cell(s) having uncontrolled, usually rapid, cellular proliferation. Tumors may be benign or malignant, while cancer cells are always considered to be malignant.

As used herein, "therapeutically effective amount" refers to administration of a pharmaceutical composition according to a dosage amount and/or a dosage regimen sufficient to treat a specific disease. For example, a therapeutically effective amount of an antibody according to the embodiments described herein is an amount of an antibody that is sufficient to ameliorate symptoms associated with a tumor or with cancer, to prevent or delay the growth of the tumor or onset of the cancer, or to lessen the severity or frequency of symptoms of the tumor or of cancer. One of ordinary skill in the art will appreciate that a therapeutically effective amount or dose may depend on a variety of factors, including the type of tumor or cancer, the route of administration of the therapeutic composition, the characteristics of the patient, the extent to which the tumor or cancer has metastasized, and/or the clinical judgment of the health practitioner. Effective doses may also be extrapolated from dose-response curves derived from in vitro or animal model test systems.

Neoantigens and Neoepitopes

Tumor cells contain anywhere from a few to about a thousand somatic mutations (see, Fritsch, *Cancer Immunol. Res.* (2014) 2(6): 522-529). These somatic mutations may lead to the generation of novel peptide sequences, referred to as neoantigens, which are not present in germline or normal cells. In almost all cases, neoantigens are specific to the tumor cells and patients from which they originate.

Somatic mutations may arise from a variety of different types of mutations, including but not limited to: nucleotide substitutions (e.g., single nucleotide variants (point mutations)), DNA rearrangements, copy number alterations, transversions, indels (insertions and/or deletions), amplifications, fusion/translocation events, and any other alternations in the germline sequence that result in novel amino acid sequences. With regard to their protein expression, such mutations can lead to non-sense mutations resulting in stop codons, missense mutations resulting in encoding of different amino acids at particular locations, or frame shifts with regard to protein translation. These errors in amino acid sequence can lead to non-functional proteins or proteins with altered functional properties.

Somatic mutations may be trunk mutations or branch mutations. Trunk mutations are present in the majority of tumor cells. Branch mutations are present in subclonal populations of the tumor cells.

Somatic mutations may be classified as driver mutations or passenger mutations. Driver mutations include those mutations that confer growth advantages to tumorigenic/cancer cells. Passenger mutations include those mutations that have not conferred a growth advantage to tumorigenic/cancerous cells, but are present in the population of tumorigenic/cancerous cells.

It is understood that the techniques presented herein are applicable to any type of tumor, including but not limited to, primary tumors (e.g., the original tumor), secondary tumors (e.g., tumors of the same type as the original tumor but present in a different location of the body), recurrent tumors (e.g., reappearance(s) of the primary or secondary tumor), derivative tumors (e.g., a primary or secondary tumor that has acquired additional mutations), and metastases thereof, regardless of their location.

According to the present disclosure, neoantigens may comprise one or more neoepitopes. In some embodiments, neoepitopes that bind to MHC class I molecules are typically about 9 amino acids in length, while neoepitopes that bind to MHC class II molecules are typically about 14 to 20 amino acids in length. In other embodiments, neoepitopes that bind to MHC class I molecules are typically about 7 to 11 amino acids in length, while neoepitopes that bind to MHC class II molecules are typically about 15 to 25 amino acids in length. It should be noted that neoepitopes as used herein are characterized as random mutations or pattern-type mutations in tumor cells that give rise to unique and tumor specific antigens with respect to a given patient.

To trigger a T cell response, neoepitopes typically need to bind to two domains, e.g., the MHC domain and the T cell receptor domain. Thus, a neoepitope will have specified amino acid residues at specific positions, referred to as anchoring residues, that result in binding or anchoring of the neoepitope to the MHC. For MHC class I molecules, it is understood that these anchoring residues may vary depending upon the specific HLA alleles possessed by the patient. Similarly, for MHC class II molecules, it is understood that these anchoring residues may vary depending upon the specific HLA alleles possessed by the patient. Thus, the same neoepitope may bind to a MHC class I or class II receptor in one patient, but may not bind to a MHC class I or class II receptor in another patient having different HLA alleles.

Neoepitopes arising from somatic mutations are primarily displayed via the MHC class I pathway. This pathway targets intracellularly derived mutant sequences such as neoantigens/neoepitopes. However, it is understood that in the context of therapeutic applications (particularly immunotherapy), and as described in additional embodiments throughout this application, the neoepitopes presented herein can be used to trigger immune responses in both MHC class I and MHC class II pathways. For example, for a neoepitope to activate a MHC class II pathway, in one embodiment, synthesized neoepitope peptide(s) may be injected, endocytosed, and processed for presentation (e.g., involving binding to a MHC class II molecule on the surface of the cell). Alternatively, cytoplasmic and nuclear antigens can be engulfed by autophagy and processed according to a MHC class II pathway. In still other embodiments, an antigen presenting cell (APC) may exhibit cross-presentation, e.g., by presenting exogenous antigens with MHC class I molecules.

A neoepitope will also have specified amino acid residues at other designated positions, referred to as T cell binding residues, which result in binding or anchoring of the neoepitope to the T cell, e.g., a CD8+ T cell or CD4+ T cell. Similarly, the amino acid residues that interact with the T cell receptor may also vary from patient to patient, based on the diversity of T-cell receptors (e.g., allelic sequence variation within the T cell receptor (TCR) loci) of the patient.

There are multiple mechanisms which may facilitate triggering of an immune response by a neoepitope. In some embodiments, the neoepitope may have an increased binding affinity to the MHC complex as compared to its non-mutated counterpart. In other embodiments, the neoepitope may bind to the T-cell receptor with an increased binding affinity as compared to its non-mutated counterpart. In still other embodiments, the neoepitope may undergo a structural change as compared to its non-mutated counterpart, which facilitates binding to the T-cell receptor and/or MHC molecule. Other mechanisms are possible, and all such mechanisms are contemplated herein.

An advantage to neoepitope based therapies is that these sequences are specific to tumor cells, and therefore, limitations present with existing therapies based on self-antigens (e.g., autoimmune toxicity that results in the destruction of healthy tissues, organs and/or cells, or T-cell tolerance in which the immune system fails to recognize the tumor cell) are unlikely to be particularly problematic with these techniques. Additionally, since neoantigens are tumor- and patient-specific, therapies can be personalized to individual patients. By utilizing neoepitopes, patient- and tumor-specific therapies with minimal side effects can be developed.

In some embodiments, the neoepitope has an above-normal expression level as compared to a matched normal control. Expression levels may be quantified by any suitable technique known in the art, including but not limited to, quantitative RNA analysis (e.g., RNA-Seq) or quantitative proteomics analysis (e.g., mass spectrometry). It is also understood that the tumor cells may exhibit altered protein expression of non-mutated proteins, including overexpression or underexpression of non-mutated proteins.

Obtaining a Tumor Sample From a Patient

A tumor sample from the patient may be obtained by any conventional technique, including but not limited to biopsy (e.g., excisional biopsy, incisional biopsy, percutaneous needle biopsy, etc.) or surgical resection, etc. In some embodiments, a biopsy is performed once to obtain patient-specific tumor cells. Once obtained, the cells may be propagated in cell culture according to known techniques in the art for immediate use (e.g., omics analysis) or frozen into aliquots for subsequent use.

Various types of information may be obtained from an omics analysis of a tumor sample, as discussed herein. In an embodiment, the tumor is subjected to, e.g., genome or exome sequencing, and the mutational profile of a tumor from a particular patient can be determined. As disclosed herein, the sequence information from the tumor can be compared to a matched normal control or other reference sequence (if a matched normal control is not available) to identify locations of mutations in the tumor genome as well as the mutational load (total number of mutations present).

'Omics' Analysis

In general, it is contemplated that omics' analysis includes any one or more of the following: whole genome sequencing (WGS), exome sequencing, RNA expression profiling and/or RNA quantification (RNA-Seq), proteomics analysis, metabolomics analysis, and any other type of analysis in biology used for characterizing large pools of biological molecules.

It is contemplated that genomic analysis can be performed by any number of suitable analytic methods, however, especially preferred are whole genome sequencing (WGS) and exome sequencing of both a tumor and a matched normal control sample.

In some embodiments, high-throughput sequencing/next generation sequencing methods according to methods known in the art (see, Reuter, *Mol Cell* (2016) 58(4):586-597) may be used to obtain the WGS sequence of tumor cells and of matched normal control cells. High throughput sequencing methods may also be utilized to obtain the exome sequence, which represents the coding region of the whole genome (e.g., typically about 1 to 5% of the whole genome). In other embodiments, exome sequencing may also include copy number. It is understood that any suitable sequencing technique may be utilized, including but not limited to massively parallel high throughput sequencing, ion torrent sequencing, pyrosequencing, etc.

In still other embodiments, as an alternative to WGS or exome sequencing, specific regions of the tumor cell may be targeted for sequencing, e.g., in some cases these regions may be known to be associated with tumor or cancer causing mutations. In still other embodiments, these regions may include all genes of a particular type, e.g., all kinase genes (the kinome), etc.

According to the present disclosure, it is contemplated that, prior to treatment, a tumor biopsy and matched normal control (if available) is obtained from a patient, and omics analysis is performed on the obtained tumor and matched normal control sample to identify a population of neoantigens/neoepitopes present within the tumor cells. Thus, in some embodiments, the tumor cells obtained from the biopsy contain anywhere from a few somatic mutations to about a thousand somatic mutations. In some embodiments, the tumor cell contains at least 10 somatic mutations, at least 20 somatic mutations, at least 30 somatic mutations, at least 40 somatic mutations, at least 50 somatic mutations, at least 75 somatic mutations, at least 100 somatic mutations, at least 200 somatic mutations, at least 300 somatic mutations, at least 400 somatic mutations, at least 500 somatic mutations, and so forth, up to about 1000 somatic mutations or more. Since not all somatic mutations result in neoepitopes that are capable of binding to a MHC class I or class II molecule, the total number of somatic mutations in a cell will generally be greater than the number of neoepitopes capable of being displayed on the surface of a tumorigenic/cancerous cell.

Once the sequence of the tumor (e.g., whole genome, exome, or a subset of the genome, etc.) has been obtained, the sequence of the tumor cell can be compared to the sequence of the matched normal control to determine locations and prevalence of mutations. Specifically, the tumor and matched normal control sequences may be aligned to determine the presence and locations of mutations.

The computational alignment and analysis of the sequence data may be performed in a variety of ways. Advantageously, however, analysis is performed in silico by location-guided synchronous alignment of tumor and normal samples as disclosed, for example, in US 2012/0059670A1 and US 2012/0066001A1 using BAM files and BAM servers. Of course, alternative file formats (e.g., SAM, GAR, FASTA, etc.) are also expressly contemplated herein. It should be noted that exome and/or high-throughput genome sequencing allows for rapid and specific identification of patient specific neoepitopes, particularly where the analysis also takes into account matched normal controls from corresponding normal tissue of the same patient.

Other types of omics analysis may be performed on the tumor and matched normal control. For example, RNA expression profiling and/or RNA quantification (RNA-Seq) may also be performed on the tumor (in addition to genomic sequencing) to show levels of gene expression of the tumor at a moment in time. RNA sequencing and/or quantification can be performed in all manners known in the art. The RNA expression profile may include one or more of messenger RNA (mRNA), primary transcript RNA (hnRNA), ribosomal RNA (rRNA), transfer RNA (tRNA), microRNA (miRNA), non-polyadenylated RNA, antisense RNA (asRNA), small interfering RNA (siRNA), etc. Preferred embodiments include mRNA and hnRNA. The set of expressed genes, also known as the transcriptome, is identified using RNA sequencing and is usually combined with RNA quantification indicating the amount or concentration of each RNA molecule. Identifying the transcriptome is not reliant upon known coding regions, and therefore, can identify novel transcripts, e.g., from intragenic fusions or from tumors.

In other embodiments, RNA-Seq technology may be used. This technology, also referred to as whole transcriptome shotgun sequencing (WTSS) utilizes NGS technology to reveal the presence of expressed sequences along with the quantity of the expressed sequences. RNA-Seq technology does not require species or transcript specific probes, and can detect novel transcripts, gene fusions, single nucleotide variants, indels, and other previously unknown changes difficult to detect with traditional microarray technology.

In still other embodiments, RNA sequence information may be obtained from reverse transcribed polyAtRNA, which is in turn obtained from a tumor sample and a matched normal (healthy) control sample of the same patient. PolyAtRNA is typically preferred as a representation of the transcriptome.

Analysis of expression levels can be performed in any manner known in the art and other preferred methods of RNA quantification and sequencing include quantitative PCR (qPCR) and/or real-time PCR (rtPCR)-based methods, although other methods (e.g., solid phase hybridization-based methods) also may be used. Viewed from another perspective, transcriptomic analysis may be used (alone or in combination with genomic analysis) to identify and quantify genes having a cancer- and patient-specific mutation. Other techniques for conducting RNA profiling are well known in the art (see, Vartanian et al., *BMC Genomics* (2009) 10(2): 1-16) and are contemplated herein.

Proteomics analysis, another type of omics analysis, is directed towards identification and quantification of protein expression at a moment in time and can also be performed in numerous manners. However, particularly preferred proteomics methods include antibody-based methods and mass spectroscopic methods (see, Yadav, *Nature* (2014) 515:572-576). In still other embodiments, particularly preferred proteomics methods include selected reaction monitoring. Moreover, it should be noted that proteomics analysis may not only provide qualitative or quantitative information about the protein per se, but may also include protein activity data where the protein has catalytic or other functional activity. Preferred methods include quantitative proteomics analysis. Exemplary techniques for conducting proteomic assays are found in U.S. Pat. Nos. 7,473,532 and 9,091,651. All known methods of performing proteomics analysis are contemplated herein.

Thus, in some embodiments, one or more neoepitopes are detected by whole genome sequencing. In other embodiments, one or more neoepitopes are detected by exome sequencing. In other embodiments, one or more neoepitopes are detected by RNA sequencing. In still other embodiments, one or more neoepitopes are detected by microarray or immunoassay, including ELISA, Western Transfer, or microarray hybridization probes. In other embodiments, one or more neoepitopes are detected by mass spectrometry. In still other embodiments, one or more neoepitopes may be detected by targeted sequencing panels. In yet other embodiments, one or more neoepitopes are detected by DNA-protein interactions (e.g., ChIP-sequencing) and/or epigenome characterization.

As previously mentioned, the computational alignment and analysis of the sequence data may be performed in numerous manners in silico. Any language herein directed to a computer should be read to include any suitable combination of computing devices, including servers, interfaces, systems, databases, agents, peers, engines, controllers, or other types of computing devices operating individually or collectively. Computing devices may contain comprising one or more processors configured to execute software instructions stored on a tangible, non-transitory computer readable storage medium (e.g., hard drive, solid state drive, RAM, flash, ROM, etc.).

The software instructions advantageously configure the computing device(s) to provide the roles, responsibilities, or other functionality as discussed herein with respect to the disclosed systems. Further, the disclosed technologies can be embodied as a computer program product that includes a non-transitory computer readable medium storing the software instructions that cause a processor to execute the disclosed steps associated with implementations of computer-based algorithms, processes, methods, or other instructions. In particular embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges among devices can be conducted over a packet-switched network, the Internet, LAN, WAN, VPN, or other type of packet switched network, a circuit switched network, cell switched network, or other type of network.

Additionally, any high throughput computing framework is contemplated herein including, Cluster MapReduce, Apache Spark, High Performance Computing Cluster (HPCC), Hydra, etc. These frameworks provide interfaces and analytics capabilities for processing and analyzing large sets of data.

In some embodiments, the threshold level for inclusion of neoepitopes as a therapeutic target will be an expression level of at least 20%, and more typically, at least 50% as compared to a matched normal control, thus ensuring that the epitope is at least potentially 'visible' to the immune system. (Here, it is understood that the matched normal control does not express the neoepitope, since the neoepitope is unique to the cancer cell. Therefore, the expression level of the neoepitope may be compared to the non-mutated counterpart of the neoepitope, an average gene expression level of the matched normal control, or a median gene expression level of the matched normal control.) Thus, it is generally preferred that the omics analysis also include an analysis of gene expression (transcriptomic analysis) to help identify and characterize the level of expression of the neoepitope. Viewed from another perspective, transcriptomic analysis may be suitable (alone or in combination with genomic analysis) to identify and quantify genes having a cancer- and patient-specific mutation. Numerous methods of transcriptomic analysis are known in the art, and are suitable for use herein. Taking the above into consideration, it should therefore be appreciated that a patient sample comprising DNA and RNA from tumor and matched normal control tissue can be used to identify specific mutations and to quantify expression of such mutations.

In one aspect, tumor-specific neoepitopes are identified against a matched normal control sample of a patient, and preferably subject to further analysis and filtering only if specified criteria, e.g., involving predefined structural and expression parameters, and/or sub-cellular location parameters, are met. For example, in some embodiments, it should be appreciated that neoepitope sequences are only retained provided that these sequences meet a predefined minimum expression threshold (e.g., at least 20%, 30%, 40%, 50%, or higher expression as compared to matched normal control expression). In other embodiments, neoepitopes are only retained if the mutation is due to a missense mutation and/or if expression of the neoepitope is above a minimum expression level as compared to the matched normal. In still other embodiments, filtering can be further refined by confirming a high transmembrane expression level of cancer neoepitopes, e.g., neoantigens having a membrane associated location at the outside of a cell membrane. In still other embodiments, contemplated analyses include structural calculations that delineate whether or not a neoepitope is likely to be solvent exposed, or whether the neoepitope presents a structurally stable epitope, etc. Further examples, methods, and neoepitopes are found in co-pending, co-owned International applications PCT/US16/26798 (filed 8-April-16) and PCT/US16/29244 (filed 25-April-16), both incorporated by reference herein. PCT/US16/29244 contains a table of neoepitopes, e.g., Table 1, for a variety of cancer types.

Preferably, the patient- and tumor-specific neoepitopes that are identified against a matched normal control sample of a patient, are subject to further analysis and filtering to, for example, eliminate weakly or non-expressed neoepitopes. Identified expressed neoepitopes may then be subject to additional filtering algorithms, for example, to limit neoepitopes to extracellularly exposed or MHC-I bound neoepitopes. FIG. 2 of PCT/US16/29244 (incorporated by reference herein) exemplarily shows the outcome of a series of filtering steps. Here, whole genome sequencing analysis of a triple negative breast cancer sample against matched normal (i.e., compared against non-diseased tissue of the same patient) revealed a relatively large number (~ 18,000) of neoepitopes in the tumor sample. Notably, a first filtering step removed more than 50% of all of the identified neoepitopes on the basis of expression strength. Here, neoepitope sequences were removed with an expression level of less than 20% of expression as compared to the matched normal sample. The remaining sequences were subjected to an in silico analysis to determine those sequences that would bind (e.g., less than 500 nM affinity) to a single specific HLA-type of the same sample. It should be noted that once more a substantial fraction of neoepitopes was eliminated, and that ultimately only less than 1.3% of all neoepitopes were found suitable for use.

As previously indicated, matched normal controls are used whenever possible. As an example, if only the right lung contains a tumor, but the left lung is tumor free, then it is possible to compare the tumor with normal control tissue matched to the same anatomic site (e.g., right and left inferior lobe) from the same patient. Measurements of RNA expression levels from the normal sample can be used to generate a normal expression profile, and the normal expression profile can then be compared to the RNA expression profile of the tumor in order to ascertain differences in RNA expression.

However, in cases where a matched normal control is not available, a database comprising an aggregate of expression levels of normal sequences for a particular cell, tissue, organ, or bodily fluid may be consulted. For example, a database can be accessed to obtain sequences of normal tissue samples from different individuals, e.g., matched to the same anatomic site as the tumor as well as expression profiles. These normal expression profiles can be aggregated and compared to the RNA expression profile of the tumor in order to ascertain differences in RNA expression.

Neopeptide and MHC Analysis

As immunotherapy treatment success requires neoepitopes to be presented via the MHC complex, it should be appreciated that the neoepitopes or their precursors must not only be suitable for intracellular processing via appropriate mechanisms (e.g., proteasomal cleavage, formation of a TAP complex, vesicular transport, etc.) but also must have a minimum affinity for the MHCs as determined by a patient's particular HLA-type.

For the purposes of this disclosure, it is understood that the neoepitope sequence data from omics analysis can be used to generate a pool of candidate neoepitopes having somatic mutations. However, it is not known whether these candidate neoepitopes are actually displayed on the surface of the tumorigenic cell. Not all of these mutations will appear as neoepitopes presented in conjunction with an MHC molecule or will be displayed as part of a neoantigen on the cell surface (e.g., for binding by an antibody or a T cell receptor). For a neoepitope to appear on the cell surface as part of its corresponding neoantigen, the neoantigen must be of a sufficient length and have characteristics suitable for embedding in the cell membrane (e.g., a transmembrane domain), and additionally, the neoepitope must be exposed, and not buried in the interior of the neoantigen for an antibody to bind to the exposed neoepitope. In other cases, for an immune response to be triggered, the neoepitope should also be capable of binding to a MHC class I or class II molecule for a patient's T cell receptor or a modified T cell receptor to bind to the complexed neoepitope. Thus, in some embodiments, neoepitopes are selected at least in part based on predicted ability to bind to a MHC complex or to be exposed on the cell surface. In other embodiments, and as described throughout, detection of neoepitope/MHC complexes are also possible, and in these cases, neoepitopes may be selected primarily based on predicted ability to bind to an MHC complex. Computational methods may be employed to address these types of questions.

To facilitate computational identification of neoepitopes, it is contemplated that candidate neoepitopes will be confined to relatively small fragments capable of MHC binding. In some embodiments, the candidate neoepitopes will be generated from neoantigens, with each candidate neoepitope being between about 5-25 amino acids, and in some cases longer, e.g., about 2-50 amino acids. Thus, for MHC class I binding, suitable candidate neoepitopes may preferably have a length of between 5-12 amino acids, 7-11 amino acids, 8-10 amino acids, or 9 amino acids, including the mutated amino acid. In other embodiments, for MHC class II type binding, suitable candidate neoepitopes may preferably have a length of between 12-22 amino acids, 14-20 amino acids, 15-25 amino acids, or 16-20 amino acids, including the mutated amino acid. In some embodiments, candidate neoepitopes comprising single nucleotide variants are selected and screened for their ability to bind to a MHC molecule.

In some embodiments, once the total population of candidate neoepitopes has been determined, the candidate neoepitopes are analyzed by software such as NetMHC (see, Fritsch, *Cancer Immunol. Res.* (2014) 2(6): 522-529) to predict or identify which candidate neoepitopes are most likely to bind to MHC class I molecules. In order for a neoepitope to be displayed on the surface of a cell as a MHC class I/neoepitope complex, the neoepitope needs to be capable of binding to a MHC class I molecule. Not all neoepitopes are capable of binding to a MHC, and therefore, software programs such as NetMHC can be used to predict which sequences (analysis is based on sequence information and predicted binding affinity) should be prioritized as potential therapeutic or diagnostic targets. (It is noted that NetMHCII is available for prediction of neoepitopes that bind to MHC class II molecules.) The candidate neoepitopes with predicted high affinity are more likely to be displayed complexed with the MHC molecule on the surface of the cell, provided that these candidate neoepitopes are able to be processed and transported by the cellular machinery. Accordingly, candidate neoepitopes from this group can be selected as targets for synthetic antibodies as well as for modified T cells.

In addition, additional filtering may be performed to identify candidate neoepitopes with corresponding neoantigens suitable for display on the cell surface, e.g., such as a transmembrane domain. Here, the goal is to identify neoepitopes that are displayed on the surface of the cell and that are solvent accessible, not buried within the tertiary structure of the neoantigen.

Thus, instead of randomly selecting candidate neoepitopes and generating antibodies against these candidate neoepitopes (i.e., the corresponding synthesized peptide), which may or may not appear on the surface of the cell, in silico prediction programs can be used to identify candidate neoepitopes based on one or more properties, including but not limited to, predicted high affinity to the MHC, solvent accessibility, presence of a nearby transmembrane domain, predicted stability, etc. Identification of candidate neoepitopes can be performed with a single in silico prediction program or a combination of in silico prediction programs. Candidate neoepitopes that have been identified by in silico prediction programs are referred to as in silico identified neoepitopes or identified neoepitopes. In some embodiments, in silico programs utilize neural network and machine learning approaches in conjunction with large training sets of data (e.g., data containing experimentally determined binding affinities of specific peptides to specific MHCs, data listing experimentally determined neoantigens displayed on the surface, etc.), to predict which candidate neoepitopes are optimal, e.g., which bind to MHC molecules with high affinity or any other suitable conditions.

In some embodiments, these software programs may utilize a particular allele, e.g., NetMHC utilizes a well characterized allele, HLA-A0201, to make binding predictions. In other embodiments, the in silico software program is provided with the sequence of the patient's HLA or with information identifying the patient's type of HLA (allele). Therefore, it is generally preferred that the HLA type of the patient be determined, using conventional wet-lab methods or by in silico techniques. Viewed from a different perspective, it should be appreciated that in silico identified neoepitopes may be further qualified for prediction of treatment outcome by ascertaining their binding to the patient specific MHC-type.

Thus, software programs may make predictions of affinity based on the sequence of the candidate neoepitope, sequence of the patient's MHC, and experimentally determined binding affinities from test data sets. As previously mentioned, for a given candidate neoepitope, certain residues are anchor residues that anchor the sequence to the MEW class I or class II molecule. For most MHC molecules, there are typically between one and three anchor positions, and usually one to three amino acids at each anchor position that promote binding. Thus, based upon this information and using in silico methods, affinity may be predicted using programs such as NetMHC. Other in silico programs such as ANN-Hydro utilize neural networks and machine learning to predict immunogenic epitopes, e.g., based on the presence of hydrophobic amino acids at certain positions (e.g., T-cell receptor contact residues within epitopes) as well as other factors (Chowell, D. PNAS (2015) E1754-1762).

Any MHC binding prediction program may be utilized, including but not limited to, NetMHC, NetMHCII, NetMHCpan, MAPPP/BIMAS, ANN-Hydro, and RANK-PEP or other custom software (Segal, N. et al., Cancer Res. (2008) 68(3):889-92).

While these prediction algorithms perform reasonably well with regard to binding of a candidate neoepitope to a MEW complex, these algorithms cannot predict with certainty that the in silico identified neoepitope(s) will be expressed and displayed on the surface of the tumor cell. These prediction programs generally operate based off genomic DNA (instead of RNA expression levels or protein expression levels), and accordingly, do not account for the various ways that the neoepitope can be destroyed (e.g., by the proteasome, by loss of function of the tumor cell to display neoepitopes attached to MHC molecules, by failure to express the neoepitope, etc.). It is contemplated that experimental validation is needed in order to determine whether an identified epitope is presented on the surface of a cell, and whether that identified neoepitope can trigger an immune response.

For MHC class I pathways, once a neoantigen is degraded into smaller fragments by the proteasome, the peptides (neoepitopes) are transported by the TAP transporter into the ER. The TAP transporter is found in the endoplasmic reticulum (ER) lumen and mediates transport of peptides into the ER for processing. Once delivered into the ER, the neoepitope binds to the MEW class I molecule and is transported through the Golgi apparatus and delivered to the cell surface for display. MEW class I molecules bind to epitopes originating from within the cell. Thus, it is contemplated that neoepitopes are largely processed according to MHC class I pathways. In other embodiments, APCs such as dendritic cells may exhibit cross-presentation, e.g., by presenting extracellular antigens with MHC class I molecules.

For MHC class II processes, neoantigens external to the cell are endocytosed and degraded in endocytic vesicles, which join with vesicles containing MHC class II molecules. Here, a neoepitope binds to a MHC class II molecule, and is transported to the cell surface for display. MHC class II molecules bind to foreign epitopes originating from outside the cell. Thus, it is contemplated that the MHC class II pathway could be activated by injecting a synthetic neoepitope peptide (e.g., an in silico identified neoepitope that has been synthesized) into a patient, wherein the synthetic neoepitope peptide would be processed according to MHC class II pathways and displayed on the surface of the cell. In still other embodiments, APCs such as dendritic cells may exhibit cross-presentation, e.g., by presenting extracellular antigens with MHC class I molecules. Alternatively, cytoplasmic and nuclear antigens can be engulfed by autophagy and processed according to a MHC class II pathway.

Thus, with these processes in mind, the pool of potential/candidate neoepitopes obtained from omics analysis may be further reduced by algorithms that identify sequences that are not compatible or less compatible with the cell's machinery. For example, neoantigens that are predicted to be resistant to proteasome degradation can be identified and excluded, as these molecules would not be expected to be processed and displayed on the cell surface. In other examples, neoepitopes corresponding to neoantigens that are predicted not to be displayed on the cell surface or are buried in a hydrophobic pocket can be excluded. As another example, the pool of candidate neoepitopes may be further reduced by algorithms that identify peptide fragments that are not able to be transported into the ER by the TAP transporter. Similarly, candidate neoepitopes may fail to be compatible with other cellular processes regarding processing and display of the neoepitope on the cell surface.

In some embodiments, candidate neoepitopes that are predicted to be compatible with cellular processes can be identified experimentally by determining differential affinities of neoepitopes as compared to their corresponding wildtype sequences, e.g., using surface plasmon resonance (SPR) or any other suitable technique. In some aspects, SPR can be used to determine the affinity of a neoepitope for a target (e.g., a TAP transporter, a MHC complex, etc.) as compared to the affinity of the corresponding wild type sequence for that same target, in order to identify candidate neoepitopes that are capable of being displayed on the surface of the cell. In other aspects, differential affinities can be assessed by displacement experiments, e.g., in which a labeled neoepitope displaces a corresponding wildtype sequence bound to a target. Generally, neoepitopes with high differential affinity are selected.

Thus, it is contemplated that candidate neoepitopes that are predicted to be compatible with cellular processes will be identified by in silico methods, and that these identified neoepitopes can undergo degradation, transport, binding and any other processing in order to be displayed on the surface of the cell, e.g., as part of a MHC complex. In some embodiments candidate neoepitopes may be additionally screened based upon hydrophilicity and projected stability. These candidate neoepitopes are also selected based on their ability to bind to a MHC molecule.

In other embodiments, if RNA expression data is available, then the pool of candidate epitopes may be refined by selecting those candidate neoepitopes that are overexpressed.

HLA gene complex determination can be performed using various methods of wet-chemistry that are well known in the art, and all of these methods are deemed suitable for use herein. However, in especially preferred methods, the HLA-type can also be predicted from omics data in silico using a reference sequence containing most or all of the known and/or common HLA-types. In short, a patient's HLA-type is ascertained (using wet chemistry or in silico determination), and a structural solution for the HLA-type is calculated or obtained from a database, which is then used as a docking model in silico to determine binding affinity of the candidate neoepitope to the HLA structural solution. Suitable in silico prediction methods of the HLA-type of a patient especially include those described in co-pending, co-owned U.S. provisional application 62/209,858 (filed 25-August-15), which is incorporated by reference herein. Suitable systems for determination of binding affinities include the NetMHC platform (see e.g., Lundegaard., Nucleic Acids Res. (2008) July 1; 36(Web Server issue): W509-W512). Candidate neoepitopes with high affinity (e.g., less than 100 nM, less than 75 nM, less than 50 nM) against the previously determined HLA-type are then identified.

Once patient- and tumor-specific candidate neoepitopes and HLA-type are identified, computational analysis can be performed by docking candidate neoepitopes to the MHC complex and determining the best binders (e.g., lowest $K_D$, for example, less than 50 nM). It should be appreciated that such an approach not only predicts MSI, but also identifies neoepitopes that are most likely to be presented on a cell surface with a MHC molecule and as such are most likely to elicit an immune response with a therapeutic effect. Of course, it should also be appreciated that thusly identified HLA-matched neoepitopes can be biochemically validated in vitro.

It is understood that many wet-chemistry techniques are known in the art for HLA determination, and that these techniques are within the scope of the embodiments presented herein.

In practice, neoepitopes can be scored/ranked based on allele frequency multiplied by the transcripts per million number to get a likelihood score. This score can then be further augmented using HLA information and calculated or actual binding affinity to the patient's HLA type. For example, an exemplary ranking format may be:

>254 NM_001000.3 RPL39 Missense p.M29K A→T Normal: WIRMKTGNK, AF: 0.179104477612 TPM: 1023.96 TPM_MEDIAN: 7.35 LL: 183.395820896 netMHC: 242.96 Allele: HLA-A0301 WIRKKTGNK.

Here, the file is a FASTA formatted file, and entries start with the '>' character, which reports sample information. The sample information line contains a number used for indexing the sample (e.g., 254), the Refseq Gene ID (e.g., NM 001000.3), the HUGO common name (e.g., RPL39), the variant classification (e.g., Missense), the protein change (e.g., p.M29K), the base pair change (e.g., A→T), the normal epitope (e.g., Normal: WIRMKTGNK), allele frequency (e.g., AF: 0.179104477612), Transcripts per million for this gene (e.g., TPM: 1023.96), TPM_MEDIAN which is the median expression level of all the genes (e.g., TPM_MEDIAN: 7.35), the LL score which is just AF×TPM (e.g., LL: 183.395820896), the netMHC predicted binding value (e.g., netMHC: 242.96), and the specific HLA allele that the neoepitope binds to (e.g., Allele: HLA-A0301). The next entry is the neoepitope (e.g., WIRKKTGNK).

Thus, it should be recognized that it is feasible to assemble an entire rationally-designed collection of in silico identified neoepitopes of a specific patient with a specific cancer, which can then be further tested in vitro to find or generate high-affinity antibodies that bind to these specific identified neoepitopes. Indeed, contemplated collections may include one, two, three, four, five, six-ten, 10-50, 50-150, 1,000 and even more patient- and cancer-specific identified neoepitopes. Viewed from a different perspective, the rational-designed collection of identified neoepitopes may cover between 1-10%, or between 10-25%, or between 25-60%, or between 60-100% of all neoepitopes that are expressed and bind to the HLA type of the patient. Thus, contemplated collections will comprise at least 15%, at least 25%, at least 50%, at least 70, or at least 90% of the cancer immunome (neoepitopes that are expressed and bind to the HLA type of the patient). Consequently, it should also be appreciated that even for patients with tumor immune suppression or chemotherapy-damaged immune systems, the techniques presented herein provide numerous novel targets for immune therapy.

Identification of the candidate neoepitopes are performed in silico. Once the candidate neoepitopes are identified, therapies can be created which target neoepitopes on the surface of tumor cells. It is contemplated that once the neoepitope(s) have been identified, in vitro generation of synthetic peptides having the neoepitope sequence(s) will be created, and that synthetic antibodies may be generated against these synthetic neoepitope peptides. In some cases, antibodies against the MHC/peptide complex be generated. It is also contemplated that therapies will be created to target neoepitope(s) displayed on tumor cells. More than one, more typically more than ten, or more than 100 candidate neoepitopes can be synthesized using peptide synthesis. Antibodies can be generated against these synthetic neoepitope peptides and validated experimentally with bodily fluids obtained from the patient. These techniques are discussed in more detail below.

Recombinant Expression Systems

Constructs are provided that are useful for expressing a sequence of interest (SOI) (e.g., a nucleotide sequence encoding for one or more synthetic neoepitope peptides, a nucleotide sequence encoding for a chimeric antigen receptor or a CD16 receptor, etc.) in a host cell (e.g., a tumor cell, a mammalian cell, a bacterial cell, a yeast cell, an immune competent cell, etc.). Many variations are possible and are within the skill in the art.

The SOI (e.g., nucleotide sequence encoding for the synthetic neoepitope peptide) can be recombinantly expressed in a host cell by inserting the nucleotide sequence into a suitable vector for expression in a mammalian cell and transfecting the vector into the host cell.

Vectors are DNA molecules into which a genetic insert has been introduced, allowing replication and expression of the insert in a host cell. A vector comprising the insert is referred to as recombinant DNA. Vectors include plasmids, viral vectors, cosmids, and artificial chromosomes.

Expression vectors typically comprise an origin of replication (ORI), a multicloning site comprising various restriction sites into which an insert can be cloned, and one or more selectable markers (e.g., ampicillin or tetracycline, etc.) for selection. The vector can include one or more transcription units, with a transcription unit including a promoter, a polyA signal sequence, and a transcription termination sequence. In preferred embodiments, the promoter is a mammalian promoter. In other embodiments, the promoter is a viral promoter. In other embodiments, the promoter is associated with the gene of interest. The promoters can be constitutive or inducible. If inducible, a chemical such as IPTG needs to be added to the cell culture in order for the system to recombinantly express the desired protein.

Viral promoters include but are not limited to promoters from adenovirus (such as Adenovirus 2 or 5), cytomegalovirus (CMV), herpes simplex virus (thymidine kinase promoter), retroviral promoters (e.g., MoMLV or RSV LTR), ubiquitin C (UBC), EF1a, PGK, CAGG, and simian virus 40 (SV40). Many other viral promoters are suitable, and all such viral promoters are contemplated herein.

In some embodiments, an internal ribosome entry site (IRES) is present in the insert. IRES, which forms a complex secondary structure that ribosomes can bind to, functions to promote translation initiation, allowing two open reading frames to be translated from a single transcript, e.g., two genes can be expressed from a single mRNA. For example, a single transcription unit can contain, in order, a promoter, a first insert/first coding sequence, an IRES, a second insert/second coding sequence, a polyA signal, and a termination sequence. Thus, ribosomes can attach at both the 5' UTR and the IRES to translate both the first and second insert. In some embodiments, each coding sequence will include a translational initiation site (AUG) and a stop codon.

For a description of the functional components of expression vectors, including specific examples of promoters, enhancers, terminal signals, splicing signals, polyA signals, etc., reference is made to the following laboratory manuals that describe standard techniques of molecular biology, and are known by one of skill in the art (See, e.g., Green and Sambrook eds., Molecular Cloning: A Laboratory Manual, 4$^{th}$ edition, Cold Spring Harbor Laboratory, Cold Spring Harbor, N.Y., 2012; Ausubel et al., Current Protocols in Molecular Biology, 3rd ed. 1995; Bothwell et al. Methods for Cloning and Analysis of Eukaryotic Genes, Jones and Bartlett Publ. 1990; Wu, Grossman, Moldave eds. Recombinant DNA Methodology, Academic Press 1989; Adams ed., Cell Culture for Biochemists, Elsevier/North-Holland Biomedical Press, 1990; Butler ed., Mammalian Cell Biotechnology, IRL Press, 1991.

Examples of mammalian expression vectors include, but are not limited to, adenoviral vectors, adeno-associated vectors, baculovirus vectors, herpes simplex vectors, lentiviruses, pCMV series of plasmid vectors, pSV series of plasmid vectors, retroviral vectors, vaccinia, etc. Various vectors suitable for mammalian expression are derived from viruses, there are many such suitable vectors for expression in mammalian cells and all are contemplated herein.

In embodiments in which integration into the host cell genome is desired, lentiviral expression systems may be selected. In embodiments in which integration into the host genome is not desirable, adenovirus expression systems or adeno-associated viruses expression systems may be selected.

The vectors as described herein can be introduced into any suitable host cell, preferably eukaryotic cells, which include mammalian cells. Host cells amenable to transfection and in vitro cell culture are preferred, including but not limited to monkey kidney CV1 cells transformed by SV40 (COS-7); human embryonic kidney cells (293); baby hamster kidney cells (BHK); Chinese hamster ovary cells (CHO); human cervical carcinoma cells (HELA); canine kidney cells (MDCK); human lung cells (W138); human liver cells (Hep G2); mouse mammary tumor cells (MMT 060562); human hepatoma line (Hep G2), NIH-3T3 cells, myeloma cells, etc. Various host cells are suitable for expression of mammalian expression vectors, and all suitable host cells are contemplated herein.

Various methods are known in the art for transfection of mammalian expression vectors into eukaryotic host cells, including viral transfection, lipofection, electroporation, calcium phosphate co-precipitation, rubidium chloride or polycation (such as DEAE-dextran)-mediated transfection, protoplast fusion and microinjection, see, e.g., Sambrook et al., for a description of such techniques. Preferably, the transfection method will provide an optimal transfection frequency and expression of the construct in the particular host cell line. Optimization may be performed using well-known techniques in the art.

In some embodiments, bacterial host cells are utilized to propagate mammalian expression vectors for preparation of DNA stocks for subcloning or for introduction into eukaryotic host cells. In other embodiments, bacterial host cells are utilized to produce large quantities of the protein encoded by the SOI (e.g., neoepitope). Bacterial host cells include but are not limited to *E. coli*. Yeast host cells include but are not limited to *Pichia pastoris*.

Suitable expression vectors for bacterial cells include but are not limited to bacterial expression vectors (e.g., *E. coli* expression vectors such as pGEX and pET series). In still other embodiments, suitable expression vectors include but are not limited to yeast expression vectors (e.g., pPIC series). In still other embodiments, cell-free systems containing the components needed for transcription and translation are provided.

In some embodiments, mammalian expression systems are utilized to recombinantly express the neoepitope in a host cell, including a circulating tumor cell from the patient or a proxy cell for a patient tumor cell. As referred to herein, a proxy cell is a cell selected for its similarity to a tumor cell (e.g., especially a patient tumor cell). Proxy cells may be obtained from the ATCC or other repository, and suitable software for selecting a proxy cell, such as PARADIGM, may be implemented in order to pick a proxy cell having a high similarity to a particular type of tumor cell. Preferably, the host cell should be able to express the construct comprising the neoepitope, process the neoepitope, transport the neoepitope into the ER for attachment to a MHC molecule, and display the neoepitope on the cell surface. Processing includes but is not limited to various types of post-translational modifications, including glycosylation, ubiquitination, disulfide bond formation, such as leader peptide cleavage, glycophosphatidylinositol attachment, etc.

Advantageously, adenoviral expression systems are used. In such systems, an insert comprising a nucleotide encoding one or more neoepitopes may be cloned into a shuttle vector. The shuttle vector and adenovirus backbone vector (e.g., commercially available systems such as RAPAd® Adenoviral Expression System from Cell Biolabs), are both linearized and are cotransfected into 293 cells to generate a viral stock solution in about 2-3 weeks. The viral stock solution may then be used to transfect target host cells with the nucleotide encoding the SOI(s).

In some embodiments, the transfected cells may be cultured under conditions to express the recombinant protein. In some embodiments, the cells may be subjected to suspension culture. In other embodiments, the cells may be subject to tissue culture. In still other embodiments, expression of the recombinant protein may be induced. In still other embodiments, expression of the recombinant protein may be constitutively expressed.

In some embodiments, the recombinant protein is co-expressed with co-stimulatory molecules, such as a cytokines. Immune stimulatory cytokines are added to promote or trigger an immune response. Cytokines include but are not limited to IL2, IL4, IL7, IL11, IL15, IL21, TFN-alpha, IFN-gamma, etc. In some embodiments, cytokines can reactivate exhausted T cells.

The expression systems presented herein, e.g., RNA (e.g., synthetic or man-made mRNA encoding the recombinant protein), bacterial, mammalian, yeast, etc., may also be used as therapeutic expression systems. Therapeutic systems are suitable for expressing proteins (e.g., a chimeric T cell receptor, a chimeric CD 16 receptor, a synthetic antibody, etc.) that may be administered to the patient.

In some embodiments, the structure of the recombinantly expressed neoepitope may be $(A_n\text{-}L_1)_m$, in which $A_n$ is the neoepitope peptide having the in silico identified neoepitope sequence with A being a natural (proteinogenic) amino acid and n being an integer between 5 and 50, and most typically between 7 and 11 or 15 and 25. $L_1$ is an IRES sequence (when multiple synthetic peptide sequences (identical or different) are in the construct), and m is an integer, typically between 1 and 30, and most typically between 2 and 15.

Thus, neoepitopes can also be produced by expression of a recombinant nucleic acid in a suitable host (e.g., suitable expression systems include RNA, viral, bacterial and yeast expression systems). For example, a neoantigen could be recombinantly expressed and subjected to MEW class I processing within the cell to produce one or more neoepitopes. Alternatively, the neoepitope could be recombinantly expressed and subjected to MEW class I processing within the cell, for association with a MEW class I molecule and subsequent display. This approach would also be useful in cases where multiple identified neoepitopes are to be on a single amino acid chain, optionally with spacers or cleavage sites (e.g., for proteases) separating the neoepitopes.

Peptide Synthesis

To obtain a synthetic antibody against the identified neoepitope(s), it is contemplated that the in silico identified neoepitope(s) are prepared in vitro to yield synthetic neoepitope peptide(s) having the same sequence (or greater than 80% homology) as the identified neoepitope(s). Once the synthetic neoepitope peptide(s) are synthesized, antibodies can be generated against the synthetic neoepitope peptide(s). Techniques for synthesizing synthetic neoepitope peptides and generating synthetic antibodies are presented herein. Synthetic neoepitope peptides are also referred to herein as synthetic peptides.

In other embodiments, the synthetic neoepitope peptide(s) may have 80% sequence identity, 85% sequence identity, 90% sequence identity, 95% sequence identity, 96% sequence identity, 97% sequence identity, 98% sequence identity, 99% sequence identity, or 100% sequence identity to the neoepitope on the tumor cell. In some embodiments, the sequence of the synthetic neoepitope peptide is homologous (or has 80% sequence identity, 85% sequence identity, 90% sequence identity, 95% sequence identity, 96% sequence identity, 97% sequence identity, 98% sequence identity, 99% sequence identity) as compared to neoepitope sequence data used in generation of an immune therapeutic (e.g., the expression system for expression of the neoepitope in a patient cell line or chimeric antigen receptor or chimeric CD16 receptor in a cytotoxic cell).

There are numerous methods known in the art to prepare synthetic peptides, and all known manners are deemed suitable for use herein. Solid-phase peptide synthesis, a well-developed and characterized technology for protein synthesis, is used in a preferred embodiment. For example, synthetic peptides with cancer neoepitope sequences can be prepared on a solid phase (e.g., using Merrified synthesis, also referred to as solid-phase peptide synthesis). According to some embodiments, solid phase synthesis of peptides involves attaching an initial (primary) amino acid to a solid surface and adding additional amino acids in a step-wise manner to form a peptide chain.

In general, this technique may be used to synthesize amino acids chains from two to about 100 residues. In some embodiments, a linker or spacer may be present between the solid surface and the primary amino acid. In other embodiments, the amino acid chains may optionally include unnatural amino acids, chiral peptides or other modifications to the peptide/protein backbone.

Reaction cycles in solid-phase peptide synthesis generally involve a series of reaction steps including a deprotection step, a wash step, a coupling step, and another wash step. Since the peptide is attached to the solid surface, by-products, excess reagents and other contaminants may be rinsed away while retaining the surface-attached peptide chain.

It is desirable that each step of solid phase synthesis result in a high yield, e.g., greater than 95%, 96%, 97%, 98%, or 99% yield. Solid phase peptide synthesis may be performed manually, or alternatively, may be performed by an automated synthesizer. Solid phase peptide synthesis typically proceeds in a C-terminal to N-terminal manner, in an opposite direction to that of ribosome protein synthesis.

Solid surfaces include any solid material to which an amino acid may be attached (e.g., by covalent bond formation, adsorption, complex formation, electrostatic interactions, etc.) through a specific functional group. A functional group refers to the reactive part of a molecule, including but not limited to hydroxyl, amino, alkynyl, thiol, nitril, carboxyl, carbonyl, azide, etc.

Alternatively, a synthetic neoepitope peptide corresponding to the identified neoepitope may be synthesized via liquid phase synthesis (see, U.S. Pat. No. 5,516,891), or from smaller peptide fragments. Liquid phase peptide synthesis may be preferred in instances where large-scale production of a particular peptide is needed. In still other embodiments, smaller peptide fragments may be individually synthesized and coupled together to form the desired synthetic peptide sequence. For example, multiple synthetic neoepitope peptides could be synthesized separately, with or without a linker, and then coupled together to form a longer chain.

Synthetic neoepitope peptides may be synthesized according to other known techniques, including enzymatic synthesis. In enzymatic synthesis, biological enzymes are utilized to form chains of amino acids. Proteases are commonly used due to their stability and selectivity. Proteases not only catalyze the cleavage of peptide bonds but also their formation, as well as hydrolysis of esters and kinetic resolution of racemic mixtures (see, Guzman et al., *Elec J. of Biotech* (2007) 10(2):1-32).

In some embodiments, the structure of the synthetic neoepitope peptides corresponding to or comprising the identified neoepitope sequences may be $X-L_1-(A_n-L_2)_m-Q$, in which X is an optional coupling group, functional group or moiety that is suitable to covalently or non-covalently attach the synthetic peptide to a solid phase, $L_1$ is an optional linker that covalently links the synthetic peptide to a solid phase or the coupling group. $A_n$ is the synthetic neoepitope peptide having the in silico identified neoepitope sequence with A being a natural (proteinogenic) amino acid and n being an integer between 5 and 50, and most typically between 7 and 11 or 15 and 25. $L_2$ is an optional linker that may be present, especially where multiple synthetic peptide sequences (identical or different) are in the construct, and m is an integer, typically between 1 and 30, and most typically between 2 and 15. Finally, Q is a terminal group which may be used to couple the end of the synthetic peptide to the solid phase (e.g., to sterically constrain the peptide) or to a reporter group (e.g., fluorescence marker) or to another functional moiety (e.g., affinity marker).

Consequently, where the synthetic peptide is used for direct MHC I binding, the overall length will typically be between about 7 and 11 amino acids, 8 and 10 amino acids, and preferably 9 amino acids. Similarly, where the synthetic peptide is used for direct MHC class II binding, the overall length will typically be between about 14 and 20 amino acids or 15-25 amino acids. In principal, once a suitable neoepitope is identified, both MHC class II and MHC class I pathways can be targeted in order to eliminate the tumor from the patient.

In other embodiments, when the synthetic neoepitope peptide is processed in the cell (typically via proteasome processing) prior to MHC presentation, the overall length will typically be between about 10 and 40 amino acids or longer, with the neoepitope ($A_n$) at or near a central position relative to the length of the synthetic peptide.

For example, X could be a non-covalent affinity moiety (e.g., biotin) that binds a corresponding binding agent (e.g., avidin) on the solid phase, or a functional group (with or without spacer) that reacts with the N- or C-terminal amino or carboxyl group of the synthetic peptide, or a selectively reactive group (e.g., an iodoacetyl or a maleimide group) that reacts with a sulfhydryl group in the synthetic peptide or linker $L_1$. $L_1$ may be used to increase the distance of the synthetic peptide from the solid phase and will therefore typically comprise a flexible linear moiety (e.g., comprising glycol groups, alkoxy groups, glycine, etc.) having a length equivalent to between about 2-20 carbon-carbon bonds (e.g., between 0.3 nm and 3 nm). Of course, it should also be appreciated that the synthetic peptide may use the solid phase on which the peptide was produced and as such may not require a separate coupling group or linker.

Depending on the particular synthetic peptide and coupling method, it should be appreciated that the nature of the solid phase may vary considerably, and all known solid phases and accompanying synthetic processes and chemistries for attachment of peptides are deemed suitable for use herein. For example, suitable solid phases include beads (e.g., agarose beads, polymer beads (color coded or otherwise individually addressable), magnetic beads), surfaces (e.g., wall surfaces of a well in a microtiter plate), paper, nitrocellulose, glass, plastic, metal, composite, or any combination thereof.

The person of ordinary skill in the art will be readily apprised of a suitable choice of solid phase and attachment chemistry. In further preferred aspects, it is also noted that the solid phase will generally be suitable for protocols associated with phase display methods such as allowing molecules presented on a phage (or other scaffold carrier) to reversibly bind to the solid phase (or a synthetic peptide attached to the solid phase) via the molecule presented on this phage. In still further contemplated uses, it should also be recognized that the solid phase may be a carrier protein used in vaccination (e.g., albumin, KLH, tetanus toxoid, diphtheria toxin, etc.), particularly where the synthetic protein is used as a vaccine in a mammal or as an immunogenic compound in a non-human mammal for antibody production. Likewise, the synthetic protein may also be used as a vaccine or immunogenic compound without any carrier. For example, in some embodiments, the synthetic peptide may be injected into the patient, wherein the patient's immune system will treat the synthetic peptide as a foreign antigen to undergo processing by the MHC class II pathway.

In some embodiments, the synthetic neoepitope peptide comprises additional amino acids, attached to the N- or C-terminus, which function to increase binding of the synthetic neoepitope peptide to the cellular component in the bodily fluid. In other embodiments, the synthetic neoepitope peptide comprises additional amino acids to bind to a second epitope on the cellular component.

In some embodiments, the synthetic neoepitope peptide comprises a label, e.g., a luminescent label, a fluorescent tag, etc. for detection, and also an affinity portion enabling the synthetic peptide to bind to a surface. In some embodiments, plasma or serum from the patient, may be contacted with the synthetic neoepitope peptide to determine whether antibodies present in the serum or plasma of the patient can bind to the synthetic neoepitope peptide.

In other embodiments, the synthetic neoepitope peptide comprises a label, e.g., a luminescent label, a fluorescent tag, etc. that allows sorting of the synthetic peptide bound to an immune competent cell by using FACS. Such labels also allow the immune competent cell to be detected or isolated by other means, e.g., magnetic separation.

In still further methods, it should be recognized that where the synthetic peptide (that comprises or corresponds to the cancer neoepitope) is immobilized on a solid phase, affinity agents, and particularly antibodies, to the synthetic neoepitope peptide may be isolated and/or refined. Most preferably, such isolation will include a prefabricated high-diversity library of antibodies.

Regardless of the manner of preparation of a neoepitope (e.g., recombinant or via solid phase synthesis), it should be appreciated that suitable polypeptides will include those that represent only a single neoepitope, but also those that represent at least two, or at least three, or at least four, of at least five, or between 5-10, or between 10-20, and even more neoepitopes (which will preferably be separated from each other by linker segments, typically flexible and having a length of between 5-25 amino acids).

Synthetic Antibodies

Synthetic antibodies may be generated that immunospecifically bind to synthetic neoepitope peptides. In preferred embodiments, antibody fragments (e.g., scFvs) are screened for binding to a particular synthetic neoepitope peptide, which may be attached to a bead or a surface. Affinity maturation may be employed to improve the affinity of an scFv for a synthetic neoepitope peptide. Once an antibody fragment is identified as suitable for binding to a particular synthetic peptide, the CDRs of this antibody fragment may be grafted into a human or humanized antibody scaffold or backbone, e.g., to form a full length antibody. The full-length antibody may be used for assay validation purposes or for administration as a therapeutic treatment. Therapeutic antibodies that are administered to a patient include full length antibodies as well as antibody fragments (e.g., scFvs, etc.) and are usually human or humanized.

As referred to herein, antibodies include full length antibodies and antibody fragments. The basic full length antibody structure comprises a tetramer that is composed of two polypeptide "light" chains each about 25 kDa and two polypeptide "heavy" chains of about 50 kDa. Light chains may be classified as kappa and lambda, while heavy chains may be classified as mu, delta, gamma, alpha or epsilon, with the heavy chain determining the antibody's isotype (e.g., IgA, IgD, IgE, IgG, IgM).

Each chain comprises a variable region of about 100 to 110 (or more) amino acids that govern epitope (or, in this case, synthetic neoepitope peptide) recognition, and the variable regions of each light and heavy chain together form the antibody binding site. The carboxy-terminal portion of each chain includes a constant region Fc, primarily involved in effector function.

The heavy chains and light chains have a general structure of relatively conserved framework regions (FR) joined by three hypervariable regions or CDRs (CDR1, CDR2, CDR3). The CDRs from the heavy and the light chains, which are aligned by the framework regions, enable binding to a specific synthetic neoepitope peptide.

Antibodies may be of any origin including but not limited to human, murine (e.g., mouse and rat), donkey, rabbit, goat, guinea pig, bird, camel, horse, or chicken. For therapeutic purposes, antibodies that are human or that have been humanized are preferred.

Synthetic neoepitope peptide-binding antibody fragments, including single-chain antibodies, may comprise the variable region(s) alone or in combination with the entirety or a portion of antibody hinge regions or constant regions.

The antibodies as described herein may be monospecific, bispecific, trispecific or of higher multispecificity. Multispecific antibodies may be specific for different epitopes, e.g., two or more synthetic neoepitope peptides. Here, it is presumed that the multispecific antibody only binds to neoepitopes and not to other off target molecules.

Human or humanized antibodies are particularly desirable for therapeutic treatment of human patients. Human or humanized antibodies can be made by a variety of methods known in the art including phage display or mRNA display as described herein, e.g., using antibody libraries derived from human immunoglobulin sequences.

Any methodology known in the art for screening large combinatorial libraries to identify antibodies that bind synthetic neoepitope peptides can be applied, including but not limited to phage display, yeast surface display, ribosome display, or mRNA display, or any combination thereof (see, Harlow et al., Antibodies: A Laboratory Manual, Cold Spring Harbor Laboratory Press, 2nd ed. 1988; Hammerling et al., Monoclonal Antibodies and T-Cell Hybridomas (1981) 563-681; WO 98/31700). Antibodies (including antibody fragments or variants thereof) can be produced by any method known in the art. For example, scFv libraries can be generated and used in conjunction with phage display or mRNA display technology can be used to identify antibody fragments that bind to synthetic neoepitope peptides. Additionally, antibodies may be chemically synthesized or produced through the use of recombinant expression systems. Two methods for screening large combinatorial libraries are described as follows. Among other benefits, it should be appreciated that the synthetic antibodies can be generated or isolated in substantially shorter periods of time than required for in vivo generation of antibodies and further in vitro methods to generate monoclonal antibodies.

Phage Display

In phage display methods, functional antibody domains are displayed on the surface of phage particles, which carry the polynucleotide sequences encoding the antibody domains. In a particular embodiment, such phage can be utilized to display antigen binding domains expressed from a repertoire or combinatorial antibody library (e.g., human or murine scFv library). Phage expressing an antigen binding domain that binds the antigen, in this case the synthetic neoepitope peptide, can be selected or identified, e.g., using synthetic neoepitope peptides that are bound or captured to a solid surface or bead.

Phage display may also be used for in vitro affinity maturation of an antibody that binds to a synthetic neoepitope peptide. For example, the CDR regions of the VH and VL domains, in particular, may be mutated in vitro, e.g., using error-prone PCR and/or gene shuffling. Expression of VH and VL domains with "mutant" CDRs in a phage display library allows for the selection of VH/VL combinations that bind to a given synthetic neoepitope peptide with preferred binding characteristics such as improved affinity or improved off rates.

In a typical method, a high-diversity library may be a phage display library having a diversity of at least $10^9$ diverse members, or at least $10^{10}$ diverse members, or even higher, typically based on M13 or fd phages and display via pIII, pVIII, pVI, pVII, or pIX, or based on T7 phages and the gene 10 capsid protein. Binding domains typically include Fab, Fv, scFv, or disulfide stabilized Fv antibody domains. As should be readily appreciated, use of large diversity libraries will provide in relatively short time several binding candidate antibodies that can be further selected for best binders. Indeed, where binding affinity to the immobilized synthetic peptide is less than desired, it should be recognized that affinity can be improved via affinity maturation using protocols well known in the art. For example, low affinity ($K_D > 10^{-7}M$) binders or members of smaller libraries may be subjected to affinity maturation to improve binding affinity and/or kinetics using methods well known in the art (see e.g., Carmen S., et al., Briefings In Functional Genomics And Proteomics. Vol 1. No 2. 189-203. July 2002). In addition, it should be noted that while antibody libraries are generally preferred, other scaffolds are also deemed suitable and include beta barrels, ribosome display, cell surface display, etc. (see e.g., Hosse R., Protein Sci. (2006) January; 15(1): 14-27.) Thus, it should be appreciated that in preferred aspects the synthetic peptide is used as a bait (epitope) in a library of antibodies to identify high-affinity binding ($K_D < 10^{-7}M$, and more typically $K_D < 10^{-8}M$) antibodies.

Examples of phage display methods that can be used to make the antibodies as described herein include those disclosed in Brinkman et al., *J. Immunol. Methods* 182:41-50 (1995); WO 90/02809; and U.S. Pat. No. 5,969,108.

mRNA Display

As an alternative to phage display, mRNA display may be used to obtain antibodies that bind to the synthetic neoepitope peptide. In some embodiments, the synthetic antibody is generated based upon an mRNA display method (see, recombinant antibody library expressed as RNA-protein fusions, as described in WO 98/31700 (Szostak and Roberts); and also Roberts and Szostak, *Proc. Nat'l Acad. Sci. USA*, 94:12297-12302 (1997)). In an mRNA display method, a covalent bond is formed between a synthetic mRNA and the corresponding peptide (e.g., an antibody, antibody domain, etc.) that it encodes. In particular, during in vitro translation of a synthetic mRNA carrying puromycin (a peptidyl acceptor antibiotic) at its 3' end, the puromycin forms a covalent linkage with the expressed peptide.

This technology allows a specific mRNA to be enriched from a mixture of mRNAs (e.g., a combinatorial library) based on the properties of the encoded antibody or fragment thereof. Thus, antibodies or fragments thereof that bind to an antigen (e.g., a synthetic neoepitope peptide) can be identified and isolated.

In one embodiment, mRNA display is used for in vitro evolution of scFv antibody fragments. Here, a random scFv library may be constructed, e.g., using error prone PCR and/or DNA shuffling, random mutagenesis or other techniques to modify genes encoding scFvs. The scFv library is transcribed, and the resultant mRNA is enzymatically ligated to puromycin. The scFv library is then transcribed in vitro, and the resultant expressed scFv is ligated to puromycin. In some embodiments, the synthetic neoepitope peptide is ligated to a bead or other surface. The mRNA/antibody fragment complexes are brought into contact with the synthetic peptide under conditions suitable to promote binding, and non binders are washed away. The bound molecules may be eluted by protease digestion or other suitable means of obtaining the mRNA. The mRNA is then reverse transcribed into cDNA for cloning, amplification and sequencing (see, Fukuda, *Nucleic Acids Res.* (2006) 34(19): 1-8). mRNA display for selection of antibodies from large repertoires is also described in, e.g., Brekke & Sandlie, *Nat. Rev. Drug Discovery* (2003) 2:52-62 and U.S. Pat. No. 8,623,358.

Additionally, these nucleic acid sequences can be subjected to further affinity maturation by additional rounds of screening of mRNA-peptide fusions in which mutations have been introduced into the originally selected sequence(s), or by other in vitro methods for affinity maturation of recombinant antibodies.

Depending upon how the peptide/mRNA complex is processed, the synthetic neoepitope peptide, the synthetic neoepitope peptide plus RNA, or the synthetic neoepitope peptide plus a tag may be recovered.

Nucleic acid sequences encoding antibodies or fragments thereof recovered from screening of combinatorial libraries for specificity to a given synthetic neoepitope peptide can be expressed by recombinant means (e.g., in mammalian host cells).

Grafting

For phage display or mRNA display, as the antibodies are directly coupled to the cell that carries the nucleic acid(s) encoding these antibodies, it should be further appreciated that such nucleic acid(s) can then be analyzed to identify sequence elements encoding the hypervariable loops (CDR1, CDR2, and CDR3), for light and heavy chains, respectively, and/or specificity determining residues (SDRs). Most typically, determination of residues is performed using standard sequencing methods.

Once determined, it is then contemplated that the hypervariable loops, or the CDR1-H, CDR2-H, and/or CDR3-H and/or the CDR1-L, CDR2-L, and/or CDR3-L, and/or SDRs are grafted onto a human or humanized antibody scaffold or antibody (see, U.S. Pat. No. 5,225,539). As will be readily appreciated, grafting can be done by genetic engineering of a nucleic acid that encodes a human or humanized antibody scaffold or antibody. For example, within each CDR, there are variable positions that are directly involved in the interaction with antigen, i.e., specificity-determining residues (SDRs), and there are conserved residues that maintain the conformations of CDRs loops. SDRs may be identified from the 3D structure of the antigen-antibody complex and/or the mutational analysis of the CDRs or other means. For example, a SDR-grafted humanized antibody can be constructed by grafting the SDRs and the residues maintaining the conformations of the CDRs onto a human template. Consequently, it should be recognized that human or humanized antibodies with specificity to cancer neoepitopes can be prepared in an entirely synthetic manner in which the antibody is expressed in a cell that has not previously contacted the antigen. Grafting the CDR regions of antibodies (e.g., the CDR regions that bind to the synthetic neoepitope peptides obtained by phage display, mRNA display, etc.) to a human or humanized antibody scaffold or antibody allows rapid generation of antibodies to treat a human disease. Other methods of producing antibodies, e.g., mammalian immune system, can take 3-4 months to produce an antibody and is a slow and costly process. Thus, in some embodiments, antibodies may be prepared without the use of a mammalian immune system. Moreover, contemplated methods allow production of patient and cancer specific antibodies for treatment of a patient that has failed to produce or effectively use other antibodies, such as antibodies produced by the patient's own immune system or commercially produced therapeutic antibodies against the cancer neoepitopes. Once the CDRs are grafted onto a human or humanized antibody scaffold using recombinant DNA techniques, the modified gene can be recombinantly expressed to produce an antibody that specifically binds to the neoepitope displayed on the surface of the tumorigenic cell.

Prepared synthetic antibodies can be used directly as an IgG (or other isotype), as a fragment (e.g., bispecific Fab or other bispecific fragment), and/or as a chimeric protein (e.g., scFv as ectodomain in a chimeric T cell receptor), alone or in combination with a therapeutic or diagnostic agent (including cases in which the agent is conjugated to the antibody), and/or as a hybrid protein with a transmembrane domain to ensure membrane anchoring of the antibody to a cell. Consequently, a method of generating a pharmaceutical agent or composition for cancer immune therapy is contemplated in which the synthetic antibodies are coupled to a therapeutic or diagnostic agent (which may have a cellular or non-cellular component) to obtain the pharmaceutical agent or composition.

Validation of MHC/Neoepitope Presentation

Various methods are presented herein for validating predicted MHC presentation of a neoepitope of a tumor. Once the MHC/neoepitope complex is confirmed to be present on the surface of the cell, a patient can be treated with antibodies or various other therapeutics specific to the MHC/neoepitope complex or neoepitope and/or with immune competent cells (e.g., T cells, CAR T cells, NK cells) to destroy the tumor cell.

In some embodiments, recombinant expression systems are generated to recombinantly express one or more neoepitopes, e.g., in a proxy cell or a mammalian cell. The proxy cell is transfected with the recombinant expression system and cultured under conditions suitable to express the recombinant neoepitope.

A proxy cell is a mimic of another cell, e.g., a proxy cancer cell can be selected based on similarity to a patient tumor cell. In some embodiments, proxy cancer cells may be selected due to better growth (e.g., easier to maintain in cell culture), better protein yields, or other advantages as compared to the patient tumor cell. A control population of proxy cells that are not transfected may be maintained as a control. Of course, it should be recognized that the proxy cell need not be limited to a cancer cell, but may be a non-cancerous cell that may or may not be derived from the same patient.

Proxy cancer cells include but are not limited to, e.g., an allogeneic cell genetically engineered to express patient HLA type, an allogeneic HLA-type matched cell of a cancer cell line of the same type as the cancer type, a cancer cell line of the same cancer type as the patient, etc. In some cases, the proxy cell may be genetically altered to co-express an immune stimulatory molecule, such as a cytokine. In other cases, the proxy cell may be genetically altered to recombinantly express multiple neoepitopes. Proxy cells include but are not limited to mammalian cells, human cells, and cancer cells. Proxy non-cancer cells include patient cells, non-patient cells that are HLA matched (e.g., have same HLA type to a depth of at least 4 digits), or cells from a cell line that express MHC allotypes that are identical or matched (e.g., have same HLA type to a depth of at least 4 digits) to that of the patient expressing the neoepitope in the tumor.

Various techniques can be applied to determine the presence of the MHC/neoepitope complex on the surface of the proxy cell or patient cell, including but not limited to mass spectrometry, fluorescence in situ hybridization (FISH), binding to the MHC/neoepitope complex using a synthetic antibody or synthetic T cell receptor, using patient serum/plasma comprising antibodies produced by the patient immune system, or using a labeled ligand to competitively bind to the MHC molecule. In some embodiments, the synthetic neoepitope peptide used in mRNA display or phage display assays may be labeled and used as a ligand. Other techniques include contacting the proxy cell with a cytotoxic cell (e.g., patient T cell, CAR T cell, or NK cell) having a receptor that recognizes the neoepitope bound to the MHC molecule or the neoepitope itself on the proxy cells or patient cells. Other embodiments include use of exhausted immune competent cells of the patient expressing the neoepitope in the tumor after reactivation to detect the MHC/neoepitope complex or neoepitope, and/or produce an immune response.

In some embodiments, mass spectrometry is used to determine whether the MHC/neoepitope complex is present on the surface of the cell. Cells recombinantly expressing the neoepitope can be cultured in vitro, or alternatively, cells may be isolated from a patient blood sample (e.g., circulating tumor cells) to test for the presence of the MHC/neoepitope complex on the cell surface. MHC/neoepitope complexes can be detached from the cell surface using mild lysis, proteolytic, or shear force conditions. The detached MHC/neoepitope complex can be captured using MHC specific antibodies immobilized on a surface (e.g., anti-CD3, anti-CD28 etc). Peptides and the MHC molecule can be detached from the immobilized antibody and the peptide can be dissociated from the MHC molecule using acid elution. Isotopically-labeled standards can be introduced, allowing quantification of the neoantigen and MHC molecule. In some embodiments, the neoepitope can undergo separation and fractionation prior to mass spectrometry identification and quantification. Various algorithms are available to search the obtained spectra against sequence databases. Thus, in some embodiments, if the sequence of the neoepitope is known, algorithms can be used to determine whether the obtained spectra matches the spectra of the neoepitope. Alternatively, in other embodiments, if the sequence of the neoepitope is not known, analysis can be performed post-acquisition to determine the sequence that the obtained spectra corresponds to (Tscharke et al, *Nature Reviews Immunology* (2015) 15:705-716).

In some embodiments, FISH can be used to detect aptamers that bind to synthetic neoepitope peptides or MHC/neoepitope complexes. Aptamers include oligonucleotides (e.g., RNA or DNA) or peptide molecules that can bind to peptide sequences. DNA or RNA aptamers, which typically are less than 100 nucleotides in length and form a 3D structure, can be designed to bind to a specific target (McLeod et al., *The Scientist* (2016), February pp. 1-9). Aptamers, due to their small size, can bind to epitopes in molecular groves and pockets, and therefore, can bind to both synthetic neoepitope peptides attached to a surface and/or to MHC/neoepitope complexes present on the surface of a cell. When an aptamer binds to an epitope, a fluorescent probe can be added to detect the bound aptamer. For example, in some embodiments, a misfolded RNA aptamer may bind to an epitope. Once bound, the misfolded RNA aptamer stabilizes, allowing binding of the fluorescent probe. Many different approaches for using FISH to detect binding of aptamers are available, and all such methods are contemplated herein.

In still other embodiments, protein scaffolds can be used to detect synthetic neoepitope peptides or MHC/neoepitope complexes. Protein scaffolds can also be engineered to bind to a specific molecular target. Scaffolds maintain target affinity over a wide range of temperatures and pH conditions, and can be engineered to lack cysteine resides in order to avoid unwanted side effects from crosslinking. In general, aptamers and protein scaffolds can be produced in a relatively fast timeframe, e.g., a matter of weeks.

In other embodiments, synthetic antibodies generated against the synthetic neoepitope peptide may be brought into contact with cells recombinantly expressing the neoepitope or cells that have been isolated from a patient blood sample (e.g., circulating tumor cells) to test for the presence of the MHC/neoepitope complex on the cell surface. According to some estimates (see, Mareeva et al., *J. Biol. Chem.* (2004) 43: 44243-44249), up to 80% of the solvent accessible area of a peptide is buried in the MHC binding groove when the peptide binds to a MHC molecule. Thus, as described herein, the synthetic antibody is presumed to be capable of binding to a neoepitope when bound to the MHC as well as to the neoepitope itself. In some embodiments, the neoepitope is not part of a neoantigen that is displayed on the surface of the cell, and therefore, detection of bound antibodies to the cell surface indicates that the MHC/neoepitope complex is displayed on the cell surface. In other embodiments, the neoepitope is part of a neoantigen that is displayed on the surface of the cell, and therefore, detection of bound antibodies to the cell surface indicates that the MHC/neoepitope complex and the neoepitope (if the neoepitope is exposed) is present on the cell surface.

In other embodiments, as an alternative to generating antibodies against synthetic neoepitope peptides, TCR-like mAbs, which are antibodies specific to MHC/peptide complexes can be generated to validate MHC/neoepitope complexes on the surface of the cell. TCR-like mAbs, which bind to MHC/neoepitope complexes, are designed to target intracellular neoepitopes that are not present on the surface of the cell other than in the form of a MHC/neoepitope complex. Various protocols are available for producing TCR-like mAbs. In one embodiment, a recombinantly expressed MHC/neoepitope complex is purified and refolded in a native confirmation based on the protocols in the art (see, Cohen et al., *Antibodies* (2013) 2:517-534). In some embodiments, phage display technology is utilized to produce antibodies with specificity to the MHC/peptide complex (see, Anderson et al., *Proc. Nat'l Acad. Sci USA* (1996) 93: 1820-1824). In other embodiments, hybridomas are utilized to generate antibodies with specificity to the MHC/peptide complex (Li et al., *PLOS* (2017) p. 1-11, https://doi.org/10.1371/journal.pone.0176642).

In still other embodiments, a labeled neoepitope may be used to confirm the presence of the MHC/neoepitope complex on the surface of a cell. By introducing, e.g., a radiolabeled neopeptide to cells recombinantly expressing the MHC/neoepitope complex or cells that have been isolated from a patient blood sample (e.g., circulating tumor cells), the radiolabeled neoepitope can competitively bind to the MHC molecule if the MHC molecule is present on the cell surface. Unbound radiolabeled neoepitope can be washed away, allowing bound MHC/radiolabeled neoepitope to be detected and quantified.

In still other embodiments, patient serum/plasma may be obtained from a patient, and a synthetic neoepitope peptide may be brought into contact with the serum/plasma from the patient. In general, antibodies produced by a patient's B cells may recognize linear or higher dimensional epitopes. If the patient's immune system produces antibodies against a MHC/neoepitope complex or the neoepitope (as part of a neoantigen), antibodies present in the serum/plasma sample produced by a patient's B cells (e.g., IgM or IgG antibodies) may recognize and bind to the synthetic neoepitope peptide. In some embodiments, the synthetic neoepitope peptide may be fixed to a surface. The serum/plasma sample may be brought into contact with the fixed synthetic neoepitope peptide allowing patient antibodies (if present) to bind to the synthetic peptides. Unbound components of the sample may be washed away, and a labeled secondary antibody (e.g., labeled with a radiolabel or a colorimetric tag, etc.) specific to a constant portion (Fc) of the IgG or IgM antibody may be added to detect the bound antibody. In this case, the synthetic neoepitope peptide may also be designed to comprise one or more of a luminescent or fluorescent portion for detection, and an affinity portion to bind to a surface. Detection of the bound antibody may be by secondary antibody, colorimetric detection, luminometric detection, fluorometric detection, or radiometric detection.

In other embodiments, the sequence of an antibody that binds to the MHC/neoepitope complex or to the synthetic neoepitope peptide is obtained. Based on this sequence information, a nucleotide encoding for a chimeric fusion protein having specificity for the neoepitope can be generated, ligated into a vector, and transfected into suitable cells for expression. For example, a recombinant expression system can be generated comprising a chimeric antigen receptor that binds to the MHC/neoepitope complex or to the neoepitope. Techniques to map the specificity of an antibody onto a receptor, e.g., an antigen receptor of a T cell are known in the art, e.g., grafting the specificity of an antibody can be performed using retroviral vectors. An immune competent cell, e.g., a T cell, is transfected with the recombinant expression system and cultured under conditions to express the fusion protein, e.g., a chimeric antigen receptor. In other embodiments, a NK cell may be transfected with a chimeric fusion protein that recognizes the neoepitope. A control population of cells that are not transfected may also be maintained as a control.

Thus, in some embodiments, the chimeric fusion protein construct encodes for a T cell antigen receptor that includes in its ectodomain one or more CDRs that bind to the neoepitope. In other embodiments, a chimeric fusion protein construct encodes for a T cell antigen receptor that includes in its ectodomain a scFv domain that binds to the neoepitope. The ectodomain is joined optionally using a spacer to a transmembrane domain of a T cell antigen receptor. In some embodiments, the endodomain of the T cell receptor may comprise various signaling domains, e.g., such as CD3ζ-CD28-41BB or CD3ζ-CD28-OX40, to augment potency. The CAR T cell expressing the chimeric antigen receptor may be brought into contact with a cell obtained from the patient, e.g., a patient tumor cell or a circulating tumor cell, from a biopsy or a flash frozen cell to trigger an immune response.

Thus, proxy cells or patient tumor cells can be contacted with the transfected immune competent cells or transfected precursor cells. If the transfected immune competent cells (modified immune competent cells) are able to recognize the MHC/neoepitope complex or neoepitope, or if the precursor cells are able to differentiate into cells that recognize the MHC/neoepitope complex or neoepitope, an immune response will ensue. By detecting and quantifying the presence of markers of an immune response, e.g., cytotoxic granules such as granulysin, perforin, or granzymes, in cell culture, it can be determined whether an immune response is triggered as well as the strength of the immune response.

In still other embodiments, a synthetic neoepitope peptide may be generated based on neoepitope sequence data. Immune competent cells (e.g., a T cell) may be obtained from the patient and brought into contact with the synthetic neoepitope peptide. If the immune competent cell expresses a receptor that recognizes the synthetic neoepitope peptide, then it can bind to the synthetic neoepitope peptide. In some embodiments, the immune competent cell is detected or isolated upon binding to the synthetic peptide, which may be immobilized to a surface. Detection methods also include FACS or magnetic separation as described herein.

In other embodiments, detection of an immune response is an indicator of the presence of a MHC/neoepitope complex. An expression system may be generated that is configured to recombinantly express the neoepitope. Cells (e.g., proxy cells or cells obtained from a blood sample of the patient) are transfected with the recombinant expression system, and the cells are cultured to recombinantly express the neoepitope. The transfected cells are contacted with immune competent cells to generate an immune response. Detection of an immune response confirms the presence of the MHC/neoepitope complex on the surface of the proxy cell or patient cell. In some embodiments, the immune competent cell is a T cell capable of binding to the MHC/peptide complex and triggering an immune response via the T cell receptor and other accessory molecules, e.g., CD8 molecules in the case of MHC class I receptors or CD4 molecules in the case of MHC class II receptors.

In some embodiments, in order to perform the validation, a bodily fluid is obtained from a patient. Bodily fluids include but are not limited to blood, serum, plasma, saliva, urine, tear, sweat, interstitial fluid, lymph fluid, cerebrospinal fluid, mucosa secretion, peritoneal fluid, or other bodily secretions or exudates. In some embodiments, the bodily fluid undergoes additional processing, including steps to remove or separate white blood cells from the remainder of the sample, and/or removal of the buffy coat. Plasma/serum may be utilized in antibody binding assays, while the obtained white blood cells can be used for immune response and other assays. In other embodiments, additional processing may occur to obtain tumor cells, e.g., circulating tumor cells that display MHC/neoepitope complexes from the blood sample.

Circulating tumor cells (CTCs) are cells that detach from a primary tumor and travel through the bloodstream or lymphatic system to other parts of the body. CTCs or proxy cells recombinantly expressing the neoepitope can be tested to determine if in silco identified neoepitopes are present on the surface of the tumorigenic cell as MHC/neoepitope complexes. If the identified neoepitope is displayed on the surface of the tumor cell as a MHC/neoepitope complex or neoepitope, this effectively validates the in silico identified neoepitope as a therapeutic target for personalized cancer therapy.

Cells obtained from the patient or proxy cells may be brought into contact with a synthetic antibody that specifically binds to the MHC/neoepitope complex or neoepitope. The synthetic antibody can comprise a detectable moiety such as a radionuclide (e.g., $^{11}$C, $^{13}$N, $^{15}$O, $^{18}$F, $^{123}$I, $^{99m}$Tc, $^{133}$Xe, $^{201}$Tl, $^{18}$F, etc.) detectable by radiometric techniques (e.g., PET, SPECT, beta radiation, gamma radiation, other radiation based techniques, etc.). In other embodiments, the detectable moiety may be optically and/or quantitatively detectable (e.g., colorimetric assays such as ELISA, immunohistochemistry, etc.).

Any detectable means may be used to detect binding of the synthetic antibodies to the MHC/neoepitope complexes or neoepitopes displayed on the surface of the cells. In some embodiments, the synthetic antibody is labeled with a colorimetric probe, a fluorescent tag, a chemiluminescent tag, or a radiolabel, and incubated with the bodily fluid comprising antibodies, cells or other cellular components. A variety of techniques are suitable for detecting binding of an antibody to a substrate (https://www.rndsystems.com/resources/protocols/detection-visualization-antibody-binding). Such techniques, including various fluorescently tagged, colorimetric, chemiluminescent, or radiolabeling immunoassays, are well known to a skilled artisan.

In other embodiments, the patient tumor cells or proxy cells may be placed on tissue culture plates or other surfaces coated with materials that enhance binding, e.g., poly-lysine coatings, gelatin, collagen, fibronectin, laminin, etc. After incubation of the cells with the labeled synthetic antibody, excess unbound synthetic antibody can be removed using a wash step. The remaining adhered cells can undergo imaging or other colorimetric analysis to determine whether the synthetic antibody is bound to the surface of the patient tumor cells or proxy cells.

In other embodiments, it may be desirable to isolate or enrich the patient tumor cells. In some embodiments, the synthetic antibodies are coupled to a surface and the patient tumor cells or proxy cells are brought into contact with the synthetic antibodies. In this example, the surface is generally non-adherent to cells. When the synthetic antibody binds to the MHC/neoepitope complex or neoepitope displayed on the surface of a tumor cell, e.g., a CTC cell, the cell population expressing the MHC/neoepitope complex or neoepitope can be enriched, and other cells and contaminants can be washed away. Labeled synthetic antibody can then be added to detect the presence of the MHC/neoepitope complex or neoepitope.

In other embodiments, cells may be isolated using commercially available kits (e.g., URL: tools.thermofisher.com/content/sfs/manuals/dynabeads_flowcompflexi_buffywb_man.pdf by Thermo Scientific). For example, cell isolation kits compatible with custom antibodies, e.g., the synthetic antibodies described herein, can be used to isolate cells. In this example, the synthetic antibodies may be labeled with DSB-X biotin, and incubated with patient tumorigenic cells or proxy cells that express the MHC/neoepitope complex or neoepitope. Magnetic beads (Dynabeads) are added that bind to the labeled antibody. A magnet may be used to separate cells that are bound to the magnetic beads, and those that are not bound to the magnetic beads (lacking expression of MHC/neoepitope complex or neoepitope) may be washed away. The beads may be released from the cells, and isolated patient tumor cells or proxy cells displaying the MHC/neoepitope complex or neoepitope may be obtained.

In other embodiments, antibodies are coupled to a fluorescent dye, allowing specific patient tumor cells or proxy cells expressing the MHC/neoepitope complex or neoepitope to be labeled. The labeled cells can then be separated using a fluorescence activated cell sorter (FACS). In some embodiments, the synthetic antibody is contacted with bodily fluid in the FACS (or prior to injection into the FACS).

Many other techniques for isolating cells using labeled antibodies are known in the art and all such methods are contemplated. Various protocols exist for isolating cells using antibodies, all of which are contemplated for use herein.

Therapeutic Approaches

A consequence of the validation techniques presented herein is that validation of a MHC/neoepitope complex presents a novel therapeutic target. Antibodies, antibodies conjugated to (or in addition to) chemotherapeutic drugs, antibodies conjugated to radionuclides (e.g., a radioisotope, a PET detectable isotope, a SPECT detectable isotope, etc.), or to any other molecular compound that is capable of specifically binding to the MHC/neoepitope complex can be administered to the patient for killing the tumorigenic cell and/or for detection of the tumorigenic cell. In other embodiments, antibodies may be administered along with checkpoint modulators in order to unleash an immune system response to recognize and destroy tumorigenic or cancerous cells. In still other embodiments, antibodies may be administered along with immune competent cells and/or modified immune competent cells in order to unleash an immune system response to recognize and destroy tumorigenic or cancerous cells. In still other embodiments, immune competent cells may be engineered (e.g., T cells, NK cells) to express a chimeric antigen receptor that recognizes a particular MHC/neoepitope complex or neoepitope in order to target and destroy the cell.

In other embodiments, high affinity NKs (haNKs), target activated NKs (taNKs), activated NK (aNKs), NK92 cells (e.g., commercially available from Nantkwest, 9920 Jefferson Blvd. Culver City, CA 90232), can be used to destroy cells expressing a particular neoepitope. Thus, it is possible to direct or train the patient's immune system on cancerous or tumorigenic cells with a variety of techniques (e.g., using ADCC processes, CAR T-cells, vaccines derived from neoepitopes, checkpoint inhibitors, etc.). In other embodiments, further validation can be performed to validate that the tumorigenic cells of the patient express other in silico identified neoepitopes as MHC/neoepitope complexes.

Radiologic agents may also be coupled to the antibody administered to a patient to selectively destroy a cancer cell. Suitable radiologic agents include $^{125}$I, $^{131}$I, $^{90}$Y, $^{177}$Lu, or $^{192}$Ir. Likewise, imaging agents may be coupled to the antibody or fragment thereof, and especially preferred imaging agents include PET (e.g., $^{11}$C, $^{13}$N, $^{15}$O, and $^{18}$F) and SPECT labels (e.g., $^{123}$I, $^{99m}$Tc, $^{133}$Xe, $^{201}$Tl, and $^{18}$F).

Immune Competent Cells

In some embodiments, antibodies, e.g., full-length IgG antibodies, specific to the neoepitope or MHC/neoepitope complex can be generated and administered to the patient. For example, the CDRs of the scFv determined to bind to the MHC/neoepitope complex (based on phage display or mRNA display) or neoepitope can be grafted onto a human or humanized IgG backbone. The full length IgG, specific for the neoepitope or MHC/neoepitope complex, may be mixed with the bodily fluid. IgG antibodies are involved in triggering ADCC responses, which lead to lysis and destruction of the tumor cell. ADCC is often mediated by NK cells, but other immune competent cells including macrophages, neutrophils and eosinophils may also mediate this process. Thus, in some embodiments, the CDRs of the synthetic antibody may be grafted into an IgG backbone or scaffold and administered to the patient in order to trigger an ADCC response for tumor cells displaying the MHC/neoepitope complex. In other embodiments, the CDRs of the synthetic antibody may be grafted onto an IgG backbone or scaffold and administered to the patient in order to trigger an antibody dependent cellular phagocytosis (ADCP) response, a process in which macrophages attack and destroy cells, for tumor cells displaying the MHC/neoepitope complex.

In one embodiment, a bodily fluid is obtained, wherein the bodily fluid comprises cellular components, e.g., tumorigenic cells displaying the neoepitope or MHC/neoepitope complex. The synthetic antibody is contacted with the bodily fluid under conditions to promote binding of the synthetic antibody to the displayed neoepitope or MHC/neoepitope complex. Immune competent cells are contacted with the synthetic antibody bound to the neoepitope or MHC/neoepitope complex on the tumor cell surface. Assays are then performed to detect immune responses, e.g., indicating that an ADCC response or an ADCP response has been triggered by the patient's own immune cells.

While it is generally contemplated that all cytotoxic cells are deemed suitable for use herein, especially preferred cytotoxic cells include CD8+ T cells and NK cells (even if of different origin). However, it should be appreciated that in other aspects, the cytotoxic cell or immune competent cell may also be, e.g., a macrophage, a dendritic cell, a monocyte, a neutrophil cell, a basophile, or eosinophil cell. Therefore, and viewed from a different perspective, the immune competent cells contemplated herein may effect their cytotoxic action via phagocytosis, pore formation, induction of antibody-dependent cell-mediated cytotoxicity (ADCC), by triggering TNF or fas mediated killing pathways, etc. Thus, immune competent cells may be brought into contact with the bodily fluid and with the antibodies as described herein. Advantageously, the immune competent cells, e.g., cytotoxic CD8+ cells or NK cells, target tumorigenic cells for destruction.

Assays for detecting an immune response are known in the art and are described herein. For example, assays for detecting such a response may detect a release of cytotoxic granules (e.g., granulysin, perforin, granzymes), or phagocytosis, or receptor-ligand mediated cytolysis (e.g., as mediated by the Fas/APO pathway). A variety of flow cytometric assays are available for monitoring cell-mediated cytotoxicity, e.g., based on presence of lytic granules such as perforin, granzymes, or production of TNF family members, e.g., TNF-α, FasL or TRAIL (Zaritskaya 2010, Clay, et al., *Clin. Cancer Res.* (2001) &:1127-1135).

In other embodiments, immune stimulatory cytokines are added to promote or trigger an immune response. Cytokines include but are not limited to IL2, IL4, IL7, IL11, IL15, IL21, TFN-alpha, IFN-gamma, etc. In some embodiments, cytokines can reactivate exhausted T cells, which is a state of dysfunction in T cells in which the T cells are not able to respond to effector function and have an altered transcriptional state. In some cases, immune competent cells may be engineered to recombinantly express one or more cytokines.

Moreover, it is contemplated that the cytotoxic or immune competent cells may be an autologous cell (that may be appropriately genetically engineered to display a chimeric antigen receptor (CAR), chimeric CD16, or may be an otherwise modified chimeric protein capable of recognizing the neoepitope or MHC/neoepitope complex of the patient tumor cell or proxy cell), or a heterologous cell that may be a primary cell or a cell derived from a cell culture. Cytotoxic T cells can be genetically engineered to express a CAR specific to the MHC/neoepitope complex. For example, techniques are known in the art for grafting the specificity of an antibody (e.g., a monoclonal antibody, a scFv, etc.) to an antigen receptor in the T cell, e.g., using retroviral vectors. These modified CAR T cells can be administered to the patient to recognize and eliminate the tumorigenic cell. Immune response assays can be performed to validate whether or not the CAR T cell has activity against the patient tumor cell or proxy cell.

Regardless of the source of the cell, it is generally contemplated that the cell is a mammalian cell, and especially a human cell. Additionally, and particularly where the cells are not obtained from the mammal that is to receive the subsequently modified cells, it is contemplated that the cells are rendered less immunogenic to the mammal (e.g., via HLA grafting or deletion of MHC complexes). Of course, it should also be appreciated that multiple different cell populations may be prepared that have different combinations or sub-combinations of Fc receptors and signaling moieties to even further increase the anticipated therapeutic effect. For example, two different populations of NK cells may be administered where the first type of Fc receptor is CD16a and where the cell overexpresses Fc γ-signaling subunits, and where the second type of Fc receptor is CD32a and where the cell overexpresses Fc γ-signaling subunits. In another example, two different populations of cells may be administered where the first cell is an NK cell expressing CD16a and overexpressing Fc γ-signaling subunits, and where the second cell is a CD8+ T-cell expressing CD16a and overexpressing Fc γ-signaling subunits.

In yet another example, suitable NK cells for administration may be (or may be derived from) previously established therapeutic cell lines, which are well known in the art. For example, suitable cell lines include aNK cells, haNK cells, taNK cells, NK92 cells (e.g., commercially available from Nantkwest, 9920 Jefferson Blvd. Culver City, CA 90232) or TALL 104 cells (e.g., commercially available from ATCC, CRL-11386, 10801 University Boulevard, Manassas, VA 20110 USA).

Checkpoint Modulators

Immune checkpoint modulators help regulate pathways of the immune system that are involved in self-tolerance as well as control the amplitude and duration of immune responses. In some embodiments, a tumor cell may express (or overexpress) a checkpoint modulator that inhibits a cytotoxic T cell response against the tumor cell. Accordingly, in some cases, it may be desirable to administer a molecule which alleviates checkpoint inhibition (alleviates a negative regulatory element) in order to overcome checkpoint inhibition to facilitate or augment a host immune attack against the tumorigenic or cancerous cell. In other embodiments, it may be desirable to administer a molecule which positively regulates checkpoint inhibition (promotes a positive regulatory element) in order to stimulate or enhance signaling of positive regulators of immune responses in order to facilitate or augment a host immune attack against the tumorigenic or cancerous cell. Examples of checkpoint modulators which may be targeted include but are not limited to CTLA-4, PD-1, PD-L1, GITR, OX40, LAG-3, KIR, TIM-3, CD28, CD40 and CD137.

In some embodiments, transfected cells may be contacted with immune competent cells of the patient in the presence of checkpoint inhibitors. Immune checkpoint modulators or compositions thereof are administered in a therapeutically effective amount. Immune checkpoint modulators include but are not limited to, e.g., CTLA-4 blockers such as ipilumimab or tremelimumab, and/or other agents. Checkpoint inhibitors that have been approved by the FDA include Pembrolizumab (Keytruda), Nivolumab (Opdivo), Atezolizumab (Tecentriq), Avelumab (Bavencio), and Ipilimumab (Yervoy).

In some embodiments, an immune checkpoint modulator is administered with an antibody having specificity for a MHC/neoepitope complex or neoepitope displayed on a cancer cell. In other embodiments, an immune checkpoint modulator is administered in conjunction with an antibody having specificity for a MHC/neoepitope complex or neoepitope displayed on a cancer cell and immune competent cells.

Techniques to treat cancer include surgery, radiation therapy, chemotherapy, immunotherapy, targeted therapy, hormone therapy, stem cell transplant, or other precision methods. Any of these techniques may be combined with embodiments as described herein to treat cancer.

Embodiments useful for the identification of neoepitopes associated with tumors or cancers, include, but are not limited to: Acute Lymphoblastic Leukemia (ALL), Acute Myeloid Leukemia (AML), Adrenocortical Carcinoma, AIDS-Related Cancers (including Kaposi Sarcoma, AIDS-Related Lymphoma, Primary CNS Lymphoma), Anal Cancer, Astrocytomas, Basal Cell Carcinoma, Bile Duct Cancer, Bladder Cancer, Bone Cancer, Brain Tumors, Breast Cancer, Bronchial Tumors, Burkitt's Lymphoma, Carcinoid Tumor, Carcinoma, Cardiac Tumors, Central Nervous System Cancers (including Atypical Teratoid/Rhabdoid Tumor, Ependymoma, Embryonal Tumors, Germ Cell Tumors), Cervical Cancer, Cholangiocarcinoma, Chordoma, Chronic Lymphocytic Leukemia (CLL), Chronic Myelogenous Leukemia (CIVIL), Chronic Myeloproliferative Neoplasms, Colorectal Cancer, Craniopharyngioma, Cutaneous T-Cell Lymphoma, Ductal Carcinoma In Situ (DCIS), Endometrial Cancer, Esophageal Cancer, Esthesioneuroblastoma, Extracranial Germ Cell Tumor, Extragonadal Germ Cell Tumor, Eye Cancer (including Intraocular Melanoma and Retinoblastoma), Fallopian Tube Cancer, Fibrous Histiocytoma, Gallbladder Cancer, Gastric Cancer, Gastrointestinal Carcinoid Tumor, Gastrointestinal Stromal Tumors, Germ Cell Tumors, (including Extragonadal Germ Cell Tumors, Ovarian Germ Cell Tumors, and Testicular Cancer), Gestational Trophoblastic Disease, Hairy Cell Leukemia, Head and Neck Cancer, Hepatocellular Cancer, Hodgkin's Lymphoma, Hypopharyngeal Cancer, Intraocular Melanoma, Islet Cell Tumors, Kaposi's Sarcoma, Kidney Cancer, Langerhans Cell Histiocytosis, Laryngeal Cancer, Leukemia, Lip and Oral Cavity Cancer, Liver Cancer, Lung Cancer, Lymphoma, Malignant Fibrous Histiocytoma, Melanoma, Merkel Cell Carcinoma, Mesothelioma, Metastatic Cancer, Metastatic Squamous Neck Cancer, Multiple Myeloma, Mycosis Fungoides, Myelodysplastic Syndromes, Myelodysplastic Neoplasms, Myelogenous Leukemia, Myeloid Leukemia, Myeloproliferative Neoplasms, Chronic Nasal Cavity and Paranasal Sinus Cancer, Nasopharyngeal Cancer, Neuroblastoma, Non-Hodgkin Lymphoma, Non-Small Cell Lung Cancer, Oral Cancer, Lip and Oral Cavity Cancer, Oropharyngeal Cancer, Osteosarcoma and Malignant Fibrous Histiocytoma of Bone, Ovarian Cancer, Pancreatic Cancer, Pancreatic Neuroendocrine Tumors, Papillomatosis, Paraganglioma, Paranasal Sinus and Nasal Cavity Cancer, Parathyroid Cancer, Penile Cancer, Pharyngeal Cancer, Pheochromocytoma, Pituitary Tumor, Plasma Cell Neoplasm, Pleuropulmonary Blastoma, Primary Central Nervous System Lymphoma, Primary Peritoneal Cancer, Prostate Cancer, Rectal Cancer, Renal Cell Cancer, Retinoblastoma, Rhabdomyosarcoma, Salivary Gland Cancer, Sarcoma, Osteosarcoma, Uterine Sarcoma, Sézary Syndrome, Skin Cancer, Small Cell Lung Cancer, Small Intestine Cancer, Soft Tissue Sarcoma, Squamous Cell Carcinoma of the Skin, Squamous Neck Cancer, Stomach Cancer, T-Cell Lymphoma, Testicular Cancer, Throat Cancer, Thymoma and Thymic Carcinoma, Thyroid Cancer, Ureter and Renal Pelvis Cancer, Urethral Cancer, Uterine Cancer, Uterine Sarcoma, Vaginal Cancer, Vascular Tumors, Vulvar Cancer, and Wilms Tumor.

In some embodiments, the immune therapeutic is generated using an expression system that expresses and displays a MHC/neoepitope complex or neoepitope in a patient cell line. For example, in some embodiments, the nucleotide sequence encoding the neoepitope may be cloned into an expression vector, and the expression vector introduced into a host cell using any suitable technique known in the art, e.g., transfusion, injection, transfection, etc. In other embodiments, the nucleotide sequence encoding the neoepitope may be integrated into the chromosome of the host cell. In still other embodiments, the expression system is suitable for recombinant expression in eukaryotic systems. In other embodiments, the patient cell line expressing the neoepitope can be used for antibody generation, e.g., to be used as a therapeutic agent/immune therapeutic. In other embodiments, the expression system is suitable for recombinant expression in mammalian systems. Such techniques are well known in the art, e.g., (Griffiths, et al., "Recombinant DNA technology in eukaryotes", in An Introduction to Genetic Analysis (2000), New York).

The therapeutic embodiments described herein may be administered to a patient using appropriate formulations, indications, and dosing regimens suitable by government regulatory authorities such as the Food and Drug Administration (FDA) in the United States.

In some embodiments, an antibody having specificity to a neoepitope, a MHC/neoepitope complex, a checkpoint inhibitor, immune competent cells, or any combination thereof are administered to a patient as one or more pharmaceutical compositions. The pharmaceutical composition may include a physiologically acceptable carrier or excipient. Additionally, pharmaceutical compositions may comprise one or more buffers, coloring, flavoring and/or aromatic substances, emulsifiers, lubricants, pH buffering agents, preservatives, salts for influencing osmotic pressure, stabilizers, wetting agents, etc., which do not deleteriously react with the active compounds (e.g., antibodies, checkpoint modulators, etc.) or otherwise interfere with their activity.

Pharmaceutical compositions may be formulated for a particular mode of administration. Modes of administration may include but are not limited to: topical, intravenous, intraperitoneal, subcutaneous, intranasal or intradermal routes. In other embodiments, the composition can be directly administered to a target tissue, such as heart or muscle (e.g., intramuscular), or nervous system (e.g., direct injection into the brain, intraventricularly, intrathecally), parenterally, transdermally, or transmucosally (e.g., orally or nasally).

The pharmaceutical compositions are administered in a therapeutically effective amount, which is the amount effective for treating the specific indication. In general, the pharmaceutical compositions will be administered in an amount of at least about 10 μg/kg body weight and in most cases they will be administered in an amount not in excess of about 8 mg/kg body weight per day. In most cases, the dosage is from about 10 μg/kg to about 1 mg/kg body weight daily, taking into account the routes of administration, symptoms, etc.

In some embodiments, the pharmaceutical composition is formulated for intravenous administration. Such formulations may be prepared according to standard techniques known by one of ordinary skill in the art. For example, a composition that is to be administered intravenously may have one or more ingredients (e.g., an antibody) that is in lyophilized form as a dry lyophilized powder or water free concentrate in a hermetically sealed container. In such cases, the antibody may be mixed with a suspension buffer, with sterile pharmaceutical grade water, saline or dextrose/water, etc. prior to infusion in the patient.

Administration may occur as a one-time dose or based on an interval. As used herein, "interval" indicates that the therapeutically effective amount is administered periodically (as distinguished from a one-time dose). The administration interval for a single individual need not occur at a fixed interval, but can vary over time. The term, "in combination with" or "co-administered" indicates that a composition can be administered shortly before, at or about the same time, or shortly after another composition.

In some embodiments, multiple MHC/neoepitope complexes or neoepitopes may be targeted for detection. In this regard, a synthetic antibody may be generated against each MHC/neoepitope complex or neoepitope and the combination of synthetic antibodies may be brought into contact with cells, e.g., proxy cells recombinantly expressing the neoepitopes or cells obtained from a patient blood sample.

It should be apparent to those skilled in the art that many more modifications besides those already described are possible without departing from the concepts herein. The scope of the embodiments described herein, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

EXAMPLES

Example 1. Obtaining a Tumor from a Patient

In some embodiments, a biopsy of a tumor from a patient is obtained, e.g., using fine needle aspiration. The biopsy is propagated in cell culture and aliquoted into multiple samples. At least one sample is prepared for omics analysis using standard techniques in the art. Another sample is frozen according to standard protocols and stored for additional omics analysis, as needed. If possible, a sample of a matched normal control and/or a blood sample to determine HLA type is also obtained from the patient at the time the biopsy of the tumor is performed.

Example 2. Sequencing a Tumor from a Patient and Identifying Neoepitopes in Silico Cells from the tumor biopsy are propagated/maintained using standard techniques of mammalian cell culture. The cells may be prepared for omics analysis, e.g., DNA sequencing, RNA expression and quantification, mass spectrometry analysis, immunocytochemistry analysis, etc., according to techniques known the in art.

Similarly, cells from the matched control are propagated/maintained using standard techniques of mammalian cell culture. The cells may be prepared for omics analysis, e.g., DNA sequencing, RNA expression and quantification, mass spectrometry analysis, immunocytochemistry analysis, etc. according to techniques known the in art. If a matched control is not available, a normal sample (e.g., from a different tissue) may be substituted, or alternatively, a profile stored in a database (e.g., an aggregate of normal samples from different individuals) can be used.

In some embodiments, DNA is extracted from the cells, purified according to standard techniques known in the art and provided to a high throughput sequencer for whole genome sequencing, exome sequencing or sequencing of other specified regions.

The tumor cells and the matched normal control cells are sequenced separately according to techniques known in the art, and the resultant sequences are aligned using bioinformatics alignment tools as referenced herein (e.g., BAM-BAM). Based on this comparison, the number and location of mutations of the tumor cell can be ascertained. RNA expression and quantification (e.g., RNA-Seq) may also be performed separately on tumor cells and the matched normal control cells.

In some embodiments, a patient's HLA haplotype is also determined, e.g., from a blood sample from the patient or using in silico methods as described herein, according to standard protocols known in the art.

Neoepitope sequence data comprising the tumor mutations (pool of candidate mutations) are analyzed by a MHC epitope prediction program, e.g., such as NetMHC. The MHC epitope prediction program identifies neoepitopes in silico that are predicted to bind to a MEW class I receptor. In instances in which a patient's HLA haplotype is available, the MHC epitope prediction program can also be configured to perform docking simulations between the candidate neoepitope and a MHC class I molecule that is the same or similar to the patient.

In further embodiments, the pool of candidate neoepitopes may be refined based on other characteristics, including predicted ability to be transported through the TAP inhibitor, resistance to intracellular degradation, ability to be transported through the Golgi apparatus, and any other factors which would influence successful presentation of the neoepitope on the surface of the cell.

In further embodiments, the pool of candidate neoepitopes may be refined based on other characteristics, including whether the neoantigen is likely to be displayed on the surface of the cell (e.g., whether a transmembrane domain is present in the neoantigen as well as whether the neoepitope is solvent exposed and not buried).

Candidate neoepitopes may be further refined based on expression levels, if RNA profiling is performed in addition to DNA sequencing. For a neoepitope to be expressed on the surface of a cell, it should be expressed at a high enough frequency to be visible to the cell and therefore be processed, e.g., according to the MEW class I pathway. Thus, in some embodiments, candidate neoepitopes that are expressed at low frequencies can be excluded, as these neoepitopes would not be expected to be visible to the MEW class I pathway.

Thus, from this combined analysis, one or more neoepitopes may be identified in silico for synthesis.

Example 3. Generating a Synthetic Neoepitope Peptide

Once a candidate neoepitope has been identified in silico, it may be synthesized according to known techniques in the art, e.g., solid phase peptide synthesis (see, e.g., https://www.chem.uci.edu/~jsnowick/groupweb/files/Standard_practices_for_Fmoc_based_s olid_phase_peptide_synthesis_ in_the_Nowick_Laboratory_V_1point6.pdf). Once generated, the synthetic peptide can be utilized as part of a phage display or mRNA display screen in order to identify synthetic antibodies (e.g., antibody fragments, such as scFvs) capable of binding to the synthetic neoepitope peptide.

Example 4. Generating a Synthetic Antibody Against the Synthetic Neoepitope Peptide In phage display methods, functional antibody domains are displayed on the surface of phage particles, which carry the polynucleotide sequences encoding them. In particular, DNA sequences encoding VH and VL domains are amplified from cDNA libraries (e.g., human or murine cDNA libraries of lymphoid tissues) or synthetic cDNA libraries. The DNA encoding the VH and VL domains are joined together by a scFv linker by PCR and cloned into a phagemid vector. The vector is electroporated in *E. coli* and the *E. coli* is infected with helper phage. Phage used in these methods are typically filamentous phage including fd and M13 and the VH and VL domains are usually recombinantly fused to either the pIII, pVIII, pVI, or pIX phage gene, or based on T7 phages and the gene 10 capsid protein. Phage expressing an antigen binding domain that binds to an antigen of interest (i.e. the synthetic neoepitope peptide) can be selected or identified with antigen, e.g., using labeled antigen or antigen bound or captured to a solid surface or bead. Examples of phage display methods that can be used to make the antibodies as described herein are well known in the art (see, Osbourn et al., *Nat. Biotechnol.* (1998) 16:778-81).

Alternatively, in mRNA display methods, a scFv library is generated and transcribed in vitro, and the mRNA transcript is ligated to puromycin. The mRNA is then translated in vitro and the resultant antibody fragment (e.g., a scFV) is covalently linked to its encoding mRNA through puromycin. In some embodiments, the synthetic neoepitope peptide is ligated to a bead or other surface. The mRNA/antibody fragment complexes are brought into contact with the synthetic peptide under conditions suitable to promote binding, and non-binders are washed away. The bound molecules may be eluted by protease digestion or other suitable means of obtaining the mRNA. The mRNA is then reverse transcribed into cDNA for cloning, amplification and sequencing (see, Fukuda., *Nucleic Acids Res*. (2006) 34(19): 1-8). mRNA display for selection of antibodies from large repertoires is also described in, e.g., Brekke & Sandlie, *Nat. Rev. Drug Discovery* (2003) 2:52-62 and U.S. Pat. No. 8,623,358.

Based on these techniques, antibodies or fragments thereof that bind to a given synthetic neoepitope peptide can be identified and isolated for subsequent use.

Example 5. Detection of the MHC/Neoepitope Complex on a Cell Using a Synthetic Antibody Once synthetic antibodies having specificity for the synthetic neoepitope peptides have been generated, these synthetic antibodies can be used to test for display of the MHC/neoepitope complex or neoepitope on the tumor cells or proxy cells.

The synthetic antibody can be labeled with any detectable means known in the art for detecting binding of antibodies to neoepitopes (ligands) displayed on the surface of the cells. A variety of techniques are suitable for detecting binding of an antibody to a cell surface molecule (https://www.rndsystems.com/resources/protocols/detection-visualization-antibody-binding). The synthetic antibody may be labeled with a colorimetric probe, a fluorescent tag, a chemiluminescent tag, or a radiolabel, and incubated with the bodily fluid comprising patient cells or proxy cells.

For example, live patient cells or proxy cells may be plated on a glass or plastic surface. Alternatively, other surfaces may be coated with materials to promote binding, e.g., poly-lysine coatings, gelatin, collagen, fibronectin, laminin, etc. After incubation of the cells with the detectable synthetic antibody, excess unbound synthetic antibody can be removed using a wash step. The remaining cells, adhered to the surface, can undergo imaging or other colorimetric analysis to determine whether the synthetic antibody is present.

Such techniques, including various fluorescently tagged, colorimetric, chemiluminescent, or radiolabeling immunoassays, are well known to a skilled artisan.

If the MHC/neoepitope complex is present on the surface of the cell, binding between the antibody and the MHC/neoepitope complex will be detected provided that the antibody recognizes the neoepitope bound to a MHC molecule.

Example 6. Detection of the MHC/Neoepitope Complex on a Cell Using a TCR-Like Antibody In some embodiments, TCR-like antibodies are generated to detect MHC/peptide complexes. Expression systems encoding MHC class I molecules are developed and are transformed into competent E. coli strains. Protein expression is induced and insoluble inclusion bodies containing the expressed recombinant proteins are recovered. Protein folding conditions are employed to fold MHC class I molecules (e.g., a heavy chain comprising the $\alpha_1$, $\alpha_2$, and $\alpha_3$ submits and $\beta_2$ microglobulin) into their native form. For example, for protein refolding, the MHC class 1 heavy chain (15 mg), $\beta_2$m (12.5 mg) and peptide (5 mg) are added at a 3:2.5:1 ratio into 500 ml of folding buffer (100 mM Tris.Cl pH8.0, 400 mM L-Arginine, 2 mM EDTA, 5 mM reduced-glutathione, 0.5 mM oxidised-glutathione, and 0.1 mM PMSF) and are refolded, e.g., for about 2 days. Hybridomas are generated according to protocols known in the art and hybridoma supernatants are screened for the presence of secreted antibodies recognizing the MHC/peptide based on the protocols of (Li et al, PLOS (2017) p. 1-11; https://doi.org/10.1371/journal.pone.0176642).

In other embodiments; techniques for generating TCR-like antibodies against MHC/peptide complexes based on phage display are utilized based on the protocols of Chames (see, Chames et al., Proc. Nat'l Acad. Sci USA (2000) 97: 7969-7974; see also, Andersen et al., Proc. Nat'l Acad. Sci USA (1996) 93: 1820-1824; Porgador A. et al., Immunity (1997) 6: 715-726). For example, MHC/neoepitope complexes are produced as described herein—the neoepitope is synthesized and the neoepitope and MHC molecules (recovered from inclusion bodies in E. coli) are refolded (see, Li et al., PLOS (2017) p. 1-11).

Phage display is used to generate antibodies that bind to the MHC/neoepitope complex, based on the protocols of Chames. Briefly, a large human Fab library is used for selection. Phages are first depleted for streptavidin binders, and then are incubated with decreasing amounts of biotinylated complexes. Streptavidin beads are added, and bound phages are eluted by breaking the disulfide bond formed between the MHC/neoepitope complex and biotin (using a 10-min incubation with 60 ml of 50 mM DTT). The eluted phages are diluted in PBS and are used to infect E. coli cells grown to the logarithmic phase (OD600 of 0.5).

The infected cells are plated for amplification, grown overnight at 30° C. on agar plates, and specificity of individual Fab fragments are assessed by ELISA (see, Chames, supra).

Example 7. Isolation of Tumor Cells

Various protocols exist for isolating cells using antibodies. In some embodiments, cells may be isolated using commercially available kits (e.g., Thermo Scientific, at https://tools.thermofisher.com/content/sfs/manuals/dynabeads_flowcompflexi_buffywb_man. pdf), e.g., from ThermoScientific (e.g., Dynabeads Flow Comp Flexi Kit). For example, the synthetic antibodies specific to the neoepitope or MHC/neoepitope complex may be labeled with DBS-X biotin, and incubated with tumorigenic cells expressing the neoepitope. Beads (e.g., Dynabeads), may be added to bind to the DBS-X biotin labeled antibodies, and an external magnet may be applied to separate bound cells from non-bound cells. After isolation, the beads are released by altering buffer conditions, and the magnet is used to isolate the beads from the cells. The isolated cells can be used in any downstream process.

In other embodiments, the synthetic antibodies are coupled to a surface. When these antibodies bind to the neoepitope or MHC/neoepitope complex displayed on the surface of a tumor cell, e.g., a CTC cell, the cell population expressing the neoepitope can be enriched, and other cells and contaminants can be washed away. In this case, it is generally understood that the surface is non-adherent, and that tumor cells are not adherent to the surface unless displaying ligand for the synthetic antibody.

In still other embodiments, antibodies are coupled to a fluorescent dye, allowing specific cells expressing the neoepitope or displaying the MHC/neoepitope complex to be labeled. The labeled cells can then be separated using a fluorescence activated cell sorter (FACs) (see, for an example protocol, http://www.abcam.com/protocols/fluorescence-activated-cell-sorting-of-live-cell s).

Example 8. Detection of an Immune Response

The ability of immune competent cells to elicit an immune response may be tested. A variety of assays for monitoring cellular immune responses in vivo and in vitro are available (see, Clay. et al., Clin. Cancer Res. (2001) p1127-1135).

In some embodiments, a blood sample may be drawn from a patient and tumor cells isolated or proxy cells recombinantly expressing the neoepitope may be obtained. T cells, which may also be derived from the patient, may be incubated with the tumor cells and a synthetic antibody specific for the neoepitope or MHC/neoepitope complex. The solution can be monitored to determine whether an immune response is triggered, e.g., by detecting a release of cytotoxic granules, phagocytosis, or receptor-ligand mediated cytolysis.

Traditional assays for measuring cell lysis include addition of a radioisotope, e.g., $^{51}Cr$, to cell culture, which is trapped in the interior of living cells. The radioisotope is released upon cell lysis into the extracellular fluid, providing an indicator of the amount of lysis occurring.

Other assays exist in which levels of Granzyme B are measured. Granzyme B is secreted by activated cytotoxic T cells or NK cells. Granzyme B is released through exocytosis, and in conjunction with perforin, is able to enter target cells to help trigger cell death. Enzyme linked immunoassays (e.g., ELISpot, an ELISA sandwich assay) are known in the art for quantifying the amount of secreted Granzyme B. Essentially, cells are incubated in the presence of antibodies specific for Granzyme B. The cells are removed, and a second Granzyme B specific antibody is added with a detectable marker (e.g., biotin/alkaline phosphatase streptavidin complex). Based on the intensity of color formation, the amount of Granzyme B can be quantified (see, https://www.rndsystems.com/products/human-granzyme-b-elispot-kit_el2906#product-details; Malyguine et al., Cells (2012) 1(2): 111-126).

In other embodiments, cytotoxic T cells can be engineered to express a chimeric antigen receptor, wherein specificity for the MHC/neoepitope complex has been grafted to the CAR receptor based on the synthetic antibody. The CAR T-cells can be brought into contact with the tumorigenic cells, and an immune response can be monitored according to techniques presented herein.

Example 9. Generation of CARs

A variety of techniques are available for generation of CARs. CARs comprise an antibody fragment (e.g., a scFv, one or more CDRs, a Fab fragment, etc.) fused to an optional spacer or hinge, fused to a transmembrane domain (e.g., a CD3-ζ, a CD28, etc.), fused to additional domains involved in regulation and signaling (e.g., molecules involved in T-cell activation, including 4-1BB, CD3-ζ endodomain, CD28 endodomain, ICOS, Lck, and/or OX40, etc.).

Various protocols for generating CARs are known to one of ordinary skill in the art. In one embodiment, the nucleotide sequence encoding for an scFv that binds to the neoepitope of interest may be obtained according to the techniques presented herein (e.g., phage display, mRNA display, etc.). The nucleotide sequence corresponding to the scFv may be linked to a nucleotide sequence encoding for the remaining portions of the CAR (i.e. H-TM-S, where H is an optional spacer/hinge region, TM is a transmembrane domain, and S is one, two, or three or more signaling domains). Once the full nucleotide sequence corresponding to the CAR is obtained, it is ligated into a lentiviral vector. T cells are then transfected with the lentiviral vector, the CAR is expressed, and the CAR T cells are subjected to the assays disclosed herein.

CAR T-cells have evolved over time with first generation CARs comprising a scFv or fragment thereof attached to a CD3-ζ transmembrane domain, and a CD3-ζ endodomain or FcRγ endodomain. Second generation CARs comprise a scFv or fragment thereof attached to a CD28 or a CD3-ζ transmembrane domain, combined with two or more intracellular effectors (e.g., 4-1BB, a CD28 endodomain, a CD3-ζ endodomain, DAP10, ICOS, and OX40). Third generation CARs comprise a scFv or fragment thereof attached to a CD3-ζ or CD28 transmembrane domain, and three or more intracellular effectors (e.g., 4-1BB, a CD28 endodomain, a CD3-ζ endodomain, DAP10, ICOS, Lck, and OX40a, or a FcRγ endodomain) (see, Saledain et al., Cancer Discov. (2013) 3:388-98). More recently, fourth generation CAR T cells (TRUCKs) comprise a CD3-ζ and NFAT ectodomain (Smith et al., J. Cell. Immunol. (2016) 2(2): 59-68). All of these types of constructs are contemplated for use in the methods described herein. Accordingly, the scFvs can be combined with any of these transmembrane and signaling domains in the generation of CAR cells.

CAR constructs have also been constructed to direct NK cells to a particular target as NK cells do not rely on HLA matching (unlike T cells) (see, e.g., Hermanson et al., Front Immunol (2015) 6:195; and Carlsten et al., Front Immunol (2015) 6:266). Significantly, signaling domains for CAR-NK cells include but are not limited to CD3-ζ, CD28, 4-1BB, DAP10, and OX40. Accordingly, the scFvs can be combined with any of the aforementioned transmembrane and signaling domains in the generation of CAR-NK cells. Various NK cell lines contemplated herein include but are not limited to aNK, HaNK, NK-92, NKG, NKL, NK-YS, TaNK, YT, and YTS cells.

Also contemplated herein is transfection with genes encoding for one or more cytokines, e.g., IL2, IL4, IL7, IL11, IL15, IL21, TFN-alpha, IFN-gamma. In preferred embodiments, IL-2 and/or IL-15 are transfected to promote in vivo expansion and persistence.

Example 10. Mass Spectrometry

In some embodiments, mass spectrometry is used to determine whether the MHC/neoepitope complex is present on the surface of the cell. Cells recombinantly expressing the neoepitope can be cultured in vitro, or alternatively, cells may be isolated from a patient blood sample (e.g., circulating tumor cells) to test for the presence of the MHC/neoepitope complex on the cell surface. MHC/neoepitope complexes can be detached from the cell surface using mild lysis conditions. The detached MHC/neoepitope complex can be captured using MHC specific antibodies immobilized on a surface. Peptides and the MHC molecule can be detached from the immobilized antibody and the peptide can be dissociated from the MHC molecule using acid elution. Isotopically-labeled standards can be introduced, allowing quantification of the neoantigen and MHC molecule. In some embodiments, the neoepitope can undergo separation and fractionation prior to mass spectrometry identification and quantification. Various algorithms are available to search the obtained spectra against sequence databases. Thus, in some embodiments, if the sequence of the neoepitope is known, algorithms can be used to determine whether the obtained spectra matches the spectra of the neoepitope. Alternatively, in other embodiments, if the sequence of the neoepitope is not known, analysis can be performed post-acquisition to determine the sequence that the obtained spectra corresponds to (Tscharke et al., Nature Reviews Immunology (2015) 15:705-716).

In other embodiments, MHC/neoepitope complex producing cells are lysed and the MHC/neoepitope complexes are immunoprecipitated using antibodies coupled to a CNBr-activated Sepharose resin. Peptides are eluted by acid treatment and purified by ultrafiltration, prior to being subjected to LC-MS. Characterization is based on protocols known in the art (see, Yadav, *Nature* (2014) 515:572-576).

Example 11. Example Flow Chart

As an example, a flow chart describing an embodiment of the methods described herein is presented in FIG. 1A. At step 110, a sample of a patient tumor is obtained. At step 120, omics analysis is performed on the tumor cells. At step 130, one or more neoepitopes likely to bind to a MHC are identified based on in silico techniques. At step 140, additional filtering may be performed to identify a subset of neoepitope having specified criteria. One a subset or set of neoepitopes are selected, the neoepitopes may be used to generate recombinant systems (150) or to conduct other assays based on generation of a synthetic neoepitope peptide (160). These two pathways are discussed in more detail with regard to FIGS. 1B and 1C.

Figure 1B:
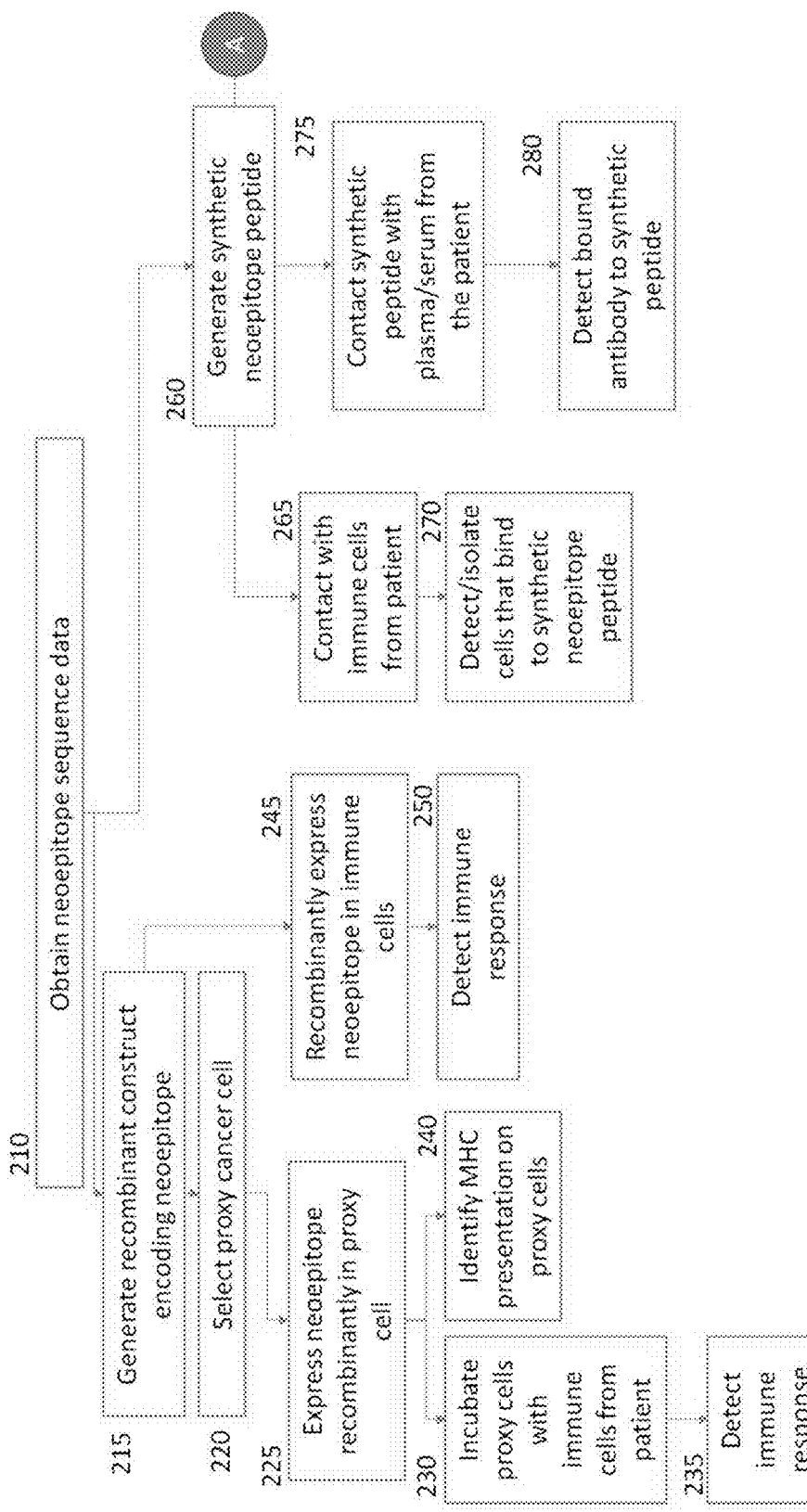
FIG. 1B-1C depict an schematic exemplary flowchart of detecting an immune response against neoepitopes.

FIG. 1B shows pathways for recombinantly expressing the neoepitope and for generating the synthetic neoepitope peptide. At step 210, neoepitope sequence data is obtained. At step 215, a recombinant construct is generated that encodes for one or more neoepitopes. At step 220, a proxy cell line is selected, similar to the patient tumor cell, and at step 225, the recombinant construct is transfected into the proxy cell line for expression of the neoepitope. Once the neoepitope is expressed, various assays can be performed. At steps 230 and 235, the proxy cells can be incubated with immune cells from the patient to determine if the patient has immune cells capable of triggering a response based on this neoepitope. At step 240, various techniques can be used to confirm that the neoepitope is presented via a MHC molecule on the surface of the proxy cell.

At step 245, the neoepitope may be recombinantly expressed in immune cells, e.g., dendritic cells. Competent immune cells may be obtained from the patient via a blood sample, and an immune response may be tested for at step 250, to determine if the dendritic cells are capable of triggering an immune response in T cells.

At step 260, a synthetic neoepitope peptide is generated. In some embodiments, the synthetic neoepitope peptide is attached to a solid support, where it is brought into contact with immune cells from the patient at step 265. At step 270, it may be detected whether the immune cells from the patient are capable of binding to the synthetic peptide. At step 275, the synthetic neoepitope peptide is attached to a solid support, where it is brought into contact with plasma/serum from the patient at step 275. At step 280, it may be detected whether the patient has antibodies that bind to the peptide. The process continues at "A" in FIG. 1C.

Figure 1C:
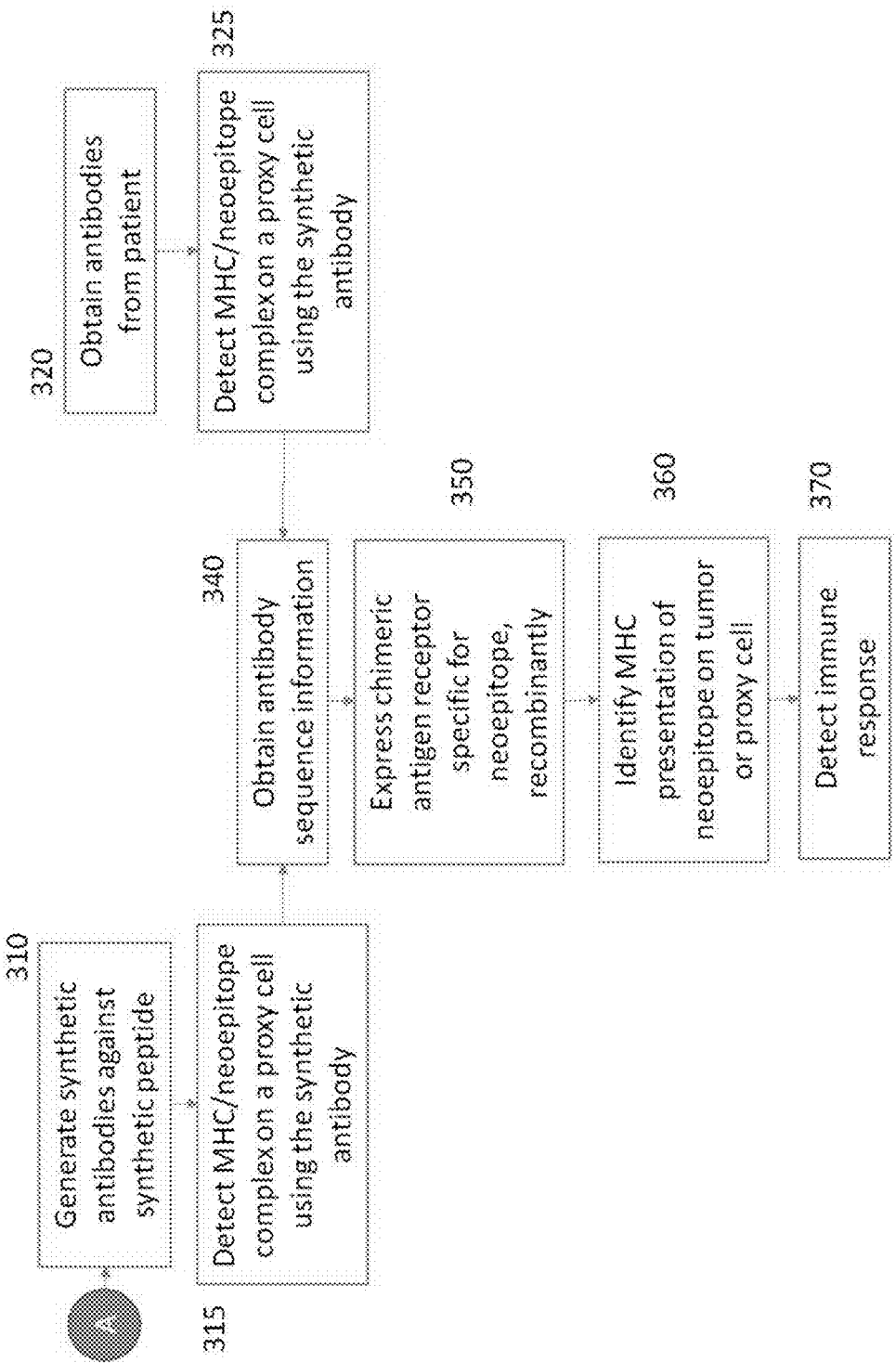

FIG. 1C, at steps 310 and 320, illustrate two possible ways to obtain the sequence of an antibody that binds to the synthetic neoepitope peptide. At step 310, synthetic antibodies can be generated. At step 315, antibodies that bind to the synthetic neoepitope peptide can be detected. At step 320, antibodies from the patient can be obtained. At step 325, patient antibodies that bind to the synthetic neoepitope peptide can be detected. At step 340, the antibody may be sequenced to determine the scFv and/or CDRs responsible for binding to the synthetic neoepitope peptide. At step 350, a construct encoding a chimeric antigen receptor may be designed, e.g., by attaching the scFv to the transmembrane domain (which is attached to intracellular signaling residues), thus, generating a CAR that is specific for the synthetic neoepitope peptide. The construct may be transfected into a cell, and cultured under conditions leading to expression of the CAR. At step 360, the CAR may be brought into contact with a tumor cell or proxy cell, and an immune response can be detected at step 370. Of course, it is understood that if the neoepitope is not present on the cell or if the antibody is unable to detect the MHC/neoepitope complex, detection of an immune response will not occur.

These examples are purely intended to be exemplary and are not intended to be limiting, as numerous different embodiments are understood to fall within the scope of the claims set forth below.

What is claimed is:

1. A method of targeting a tumor, the method comprising:
   validating predicted MHC presentation of a first neoepitope of a tumor, comprising:
      sequencing the whole genome, whole exome, or whole transcriptome of a tumor tissue of a patient and a matched normal tissue to thereby obtain tumor omics data and matched normal omics data;
      comparing, in silico, the tumor omics data and the matched normal omics data to obtain a plurality of patient- and cancer-specific neoepitopes;
      filtering in silico the plurality of neoepitopes to so obtain a filtered first neoepitope wherein the filtering is (i) filtering by type of mutation, followed by (ii) filtering by strength of RNA expression, wherein the strength of RNA expression is determined by RNA sequencing and is above a predefined minimum expression threshold of at least 20% as compared to matched normal control expression, and wherein neoepitopes are ranked based on allele frequency multiplied by transcripts per million number, and followed by (iii) filtering by subcellular location or filtering by binding affinity towards an HLA-type of the patient;
   generating a recombinant expression system configured to express a recombinant protein comprising the filtered first neoepitope sequence, and transfecting a cell with the recombinant expression system;
   culturing the transfected cell under conditions to express said recombinant protein; and
   generating a synthetic neoepitope peptide comprising the filtered first neoepitope sequence and generating a synthetic antibody that binds an MHC complex presenting the neoepitope;
   using the synthetic antibody to identify MHC presentation of said filtered first neoepitope on the surface of the transfected cell; and
   administering to the patient the synthetic antibody or an engineered immune competent cell expressing a chimeric antigen receptor comprising a binding portion of the synthetic antibody that binds the synthetic neoepitope peptide, wherein the antibody or the chimeric antigen receptor bind the MHC/neoepitope complex, thereby targeting the tumor.

2. The method of claim 1, wherein the recombinant protein further comprises a second neoepitope.

3. The method of claim 2, wherein a linker or additional amino acids are present between said first and second neoepitopes.

4. The method of claim 2, wherein said first and second neoepitopes are present in a single transcription unit.

5. The method of claim 4, wherein the single transcription unit comprises an IRES sequence.

6. The method of claim 1, wherein said recombinant protein comprises said first neoepitope.

7. The method of claim 1, wherein said recombinant protein is co-expressed with at least one co-stimulatory molecule.

8. The method of claim 7, wherein said co-stimulatory molecule is a cytokine.

9. The method of claim 1, wherein said expression system comprises:
(a) RNA;
(b) a viral expression vector;
(c) a bacterial expression vector; or
(d) a yeast expression vector.

10. The method of claim 1, wherein said expression system is a therapeutic expression system.

11. The method of claim 1, wherein said transfected cell is selected from the group consisting of:
(a) a patient cell;
(b) an immune competent cell;
(c) a precursor cell to an immune competent cell;
(d) an allogeneic HLA-type matched cell; and
(e) an allogeneic cell genetically engineered to express patient HLA type.

12. The method of claim 11, wherein said transfected cell is an allogeneic HLA-type matched cell and optionally is a cancer cell line of the same cancer type.

13. The method of claim 1, wherein transfection is performed by lipofection or viral transfection.

14. The method of claim 1, wherein culturing said transfected cell comprises placing said transfected cell in suspension culture or in tissue culture.

15. The method of claim 1, wherein culturing said transfected cell comprises inducing expression using an inducer.

16. The method of claim 1, wherein the step of using the synthetic antibody to identify MHC presentation is performed by using a fluorescence assay, a colorimetric assay, a chemiluminescence assay, or a radio-immune assay.

17. The method of claim 1, wherein said engineered immune competent cell expressing the chimeric antigen receptor is a T-cell, a NK cell, or a cytotoxic cell obtained from said patient.

* * * * *